US012544665B2

(12) United States Patent
Miyano et al.

(10) Patent No.: US 12,544,665 B2
(45) Date of Patent: Feb. 10, 2026

(54) COMPUTER SYSTEM, GAME SYSTEM, AND REPLACEMENT PLAY EXECUTION CONTROL METHOD

(71) Applicant: BANDAI NAMCO ENTERTAINMENT INC., Tokyo (JP)

(72) Inventors: Teppei Miyano, Tokyo (JP); Koji Asuna, Tokyo (JP); Kiyoshi Minami, Yokohama (JP); Kenichi Ogura, Kodaira (JP); Akio Onda, Warabi (JP); Takashi Aoki, Funabashi (JP); Shintaro Murai, Tokyo (JP)

(73) Assignee: BANDAI NAMCO ENTERTAINMENT INC., Tokyo (JP)

( * ) Notice: Subject to any disclaimer, the term of this patent is extended or adjusted under 35 U.S.C. 154(b) by 307 days.

(21) Appl. No.: 17/881,425

(22) Filed: Aug. 4, 2022

(65) Prior Publication Data

US 2022/0370906 A1 Nov. 24, 2022

Related U.S. Application Data

(63) Continuation of application No. PCT/JP2021/008639, filed on Mar. 5, 2021.

(30) Foreign Application Priority Data

Mar. 6, 2020 (JP) ................................ 2020-038901

(51) Int. Cl.
*A63F 13/537* (2014.01)
*A63F 13/40* (2014.01)

(52) U.S. Cl.
CPC ........... *A63F 13/537* (2014.09); *A63F 13/40* (2014.09)

(58) Field of Classification Search
CPC ............................... A63F 13/537; A63F 13/40
See application file for complete search history.

(56) References Cited

U.S. PATENT DOCUMENTS 8,469,821 B2 * 6/2013 Van Luchene ........ G07F 17/323 463/42
8,628,423 B2 * 1/2014 Chung .................... A63F 13/63 463/42
8,753,183 B2 * 6/2014 Davison ................ A63F 13/355 463/9
9,731,206 B2 * 8/2017 Paracha ............... G06Q 10/101
(Continued)

FOREIGN PATENT DOCUMENTS

JP 2015-097803 A 5/2015
JP 2016 042238 A 3/2016
JP 2018-206340 A 12/2018

OTHER PUBLICATIONS

"Sharing Your Gameplay," PlayStation® 4 User's Guide, <URL: https://web.archive.org/web/20180711002623/http:/manuals.playstation.net/document/jp/ps4/share/gameplay.html>.
(Continued)

*Primary Examiner* — Malina D. Blaise
(74) *Attorney, Agent, or Firm* — Oliff PLC

(57) ABSTRACT

A computer system displays a game image (IM1) during replacement play by a second user and a notification of operation details based on an operation input by the second user on a game screen (W1) displayed on a first terminal of a first user. The notification is, for example, a command input by the second user.

16 Claims, 17 Drawing Sheets

[EXAMPLE OF DISPLAY SCREEN]

(56) References Cited

U.S. PATENT DOCUMENTS

| | | | | |
|---|---|---|---|---|
| 2007/0087797 | A1* | 4/2007 | Van Luchene | A63F 13/85<br>463/1 |
| 2008/0148165 | A1* | 6/2008 | Zalewski | A63F 13/211<br>715/764 |
| 2012/0283014 | A1* | 11/2012 | Van Luchene | A63F 13/847<br>463/31 |
| 2014/0235326 | A1* | 8/2014 | Paracha | A63F 13/847<br>463/25 |
| 2017/0209790 | A1* | 7/2017 | Nomura | A63F 13/86 |
| 2017/0225082 | A1* | 8/2017 | Suwa | G06F 13/00 |
| 2017/0304723 | A1* | 10/2017 | Hain | A63F 13/26 |
| 2017/0354884 | A1* | 12/2017 | Benedetto | A63F 13/493 |
| 2018/0264363 | A1* | 9/2018 | Moberg | A63F 13/211 |
| 2019/0291011 | A1* | 9/2019 | Benedetto | G06N 3/08 |
| 2021/0236931 | A1* | 8/2021 | Cox | A63F 13/5375 |
| 2021/0373676 | A1* | 12/2021 | Jorasch | A63F 13/215 |
| 2021/0399911 | A1* | 12/2021 | Jorasch | H04L 12/1818 |
| 2021/0400142 | A1* | 12/2021 | Jorasch | H04L 65/1069 |

OTHER PUBLICATIONS

May 18, 2021 International Search Report issued in International Patent Application No. PCT/JP2021/008639.

* cited by examiner

FIG.14

[NOTIFICATION CONDITION CANDIDATE LIST] 340

| CONDITION NO. | NOTIFICATION CONDITION |
|---|---|
| 001 | REMAINING PHYSICAL STRENGTH IS 20% OR LESS (DISADVANTAGEOUS FOR USER) |
| 002 | GOOD OPPORTUNITY TO USE KILLER TECHNIQUE A (ADVANTAGEOUS FOR USER) |
| 003 | REMAINING TIME IS 10 SECONDS OR LESS (JUST BEFORE END) |
| 004 | JUMPING OVER FENCE (DIFFICULT-TO-HANDLE SCENE) |
| 005 | ARRIVAL AT B SQUARE |
| 006 | APPEARANCE OF CHARACTER C |
| ⋮ | ⋮ |

[ANOTHER EXAMPLE OF GAME SYSTEM]

[ANOTHER EXAMPLE OF GAME SYSTEM]

COMPUTER SYSTEM, GAME SYSTEM, AND REPLACEMENT PLAY EXECUTION CONTROL METHOD

CROSS REFERENCE TO RELATED APPLICATION

This application is a continuation of International Patent Application No. PCT/JP2021/008639, having an international filing date of Mar. 5, 2021, which designated the United States, the entirety of which is incorporated herein by reference. Japanese Patent Application No. 2020-038901 filed on Mar. 6, 2020 is also incorporated herein by reference in its entirety.

BACKGROUND

As one form of game systems via a communication network such as the Internet, there is known a game system in which a certain user (first user) shares images of the game played by himself/herself with another user (second user). There is also known a game system enabling replacement play in which a first user's right to perform game operations is transferred to a second user and the second user performs gameplay in place of the first user. Japanese Unexamined Patent Application Publication No. 2016-042238 discloses an example of such a game system.

The above replacement play may be assumed to be used, for example, in such a manner that the first user allows the second user as a skilled player to take on gameplay in his/her place (replacement play) in a scene difficult to handle for the first user and follows the second user's gameplay as a model for overcoming the difficult scene. In such a case, the first user will wish to learn in particular the details of the second user's specific operations such as what operations were performed at what timings by the second user. However, it may be difficult for a novice player unfamiliar with the game to understand the details of the specific operations only by watching the game images during replacement play.

BRIEF DESCRIPTION OF THE DRAWINGS

FIG. 14 is a diagram illustrating an example of a notification condition candidate list.

DESCRIPTION OF EXEMPLARY EMBODIMENTS

Figure 1:
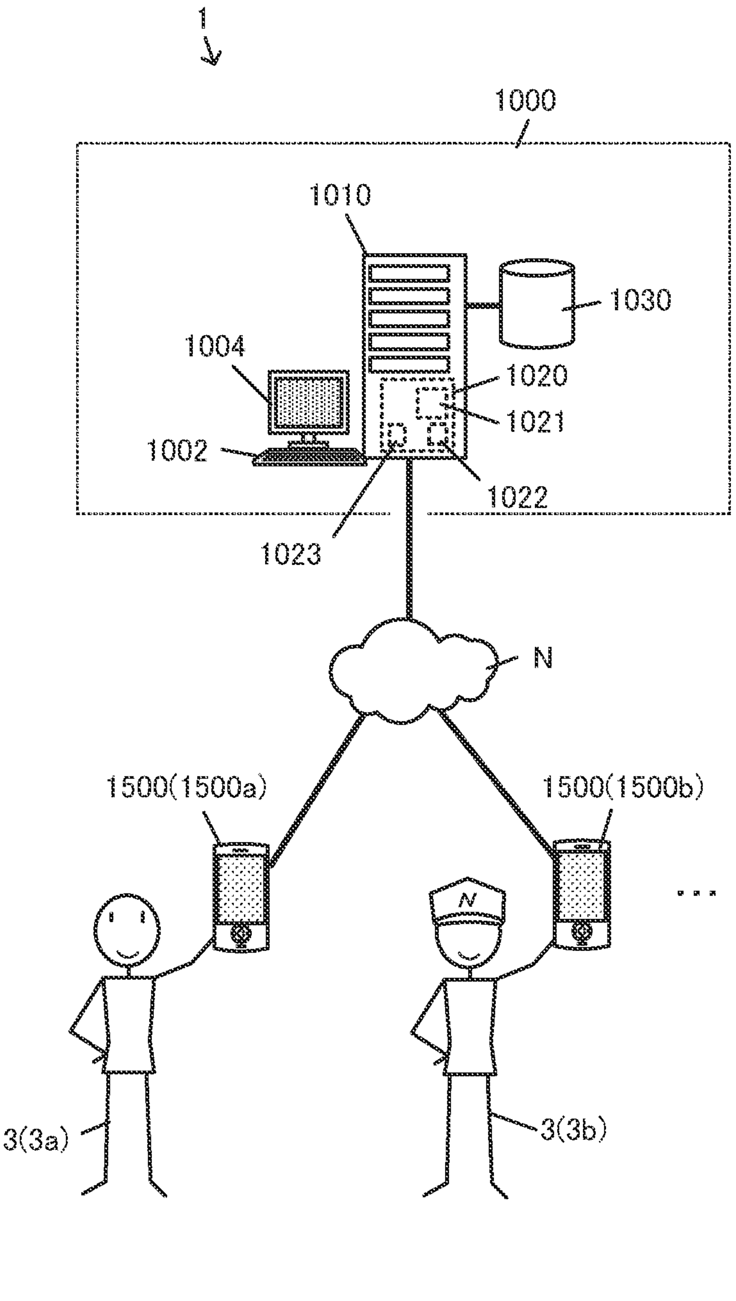
FIG. 1 is a diagram illustrating an example of a configuration of a game system.

The following disclosure provides many different embodiments, or examples, for implementing different features of the provided subject matter. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed. Further, when a first element is described as being "connected" or "coupled" to a second element, such description includes embodiments in which the first and second elements are directly connected or coupled to each other, and also includes embodiments in which the first and second elements are indirectly connected or coupled to each other with one or more other intervening elements in between.

A first disclosure is a computer system comprising at least one processor or circuit programmed to execute:

- a game management of managing execution of a game in which a second user can perform replacement play using a second-user interface in place of gameplay performed by a first user using a first-user interface;
- a game image display control of performing a control to display a game image during the replacement play on display screens of the first-user interface and the second-user interface; and
- a notification control of causing the first-user interface to provide a notification of operation details based on the operation input by the second user during the replacement play.

According to the disclosure, in some embodiments, in a game enabling replacement play in which the second user performs the first user's gameplay, the first user can easily grasp the details of the operation performed by the second user during the replacement play. That is, during the replacement play by the second user, the game image is displayed and the notification of the details of the operation based on the operation input by the second user is provided in the first-user interface. This allows the first user to grasp the details of the operation performed by the second user from the provided notification while watching the game image.

A second disclosure is the computer system, wherein the notification control includes providing the notification of a command input by the second user or an action based on the command.

According to the disclosure, in some embodiments, during the replacement play, the notification of the command input by the second user or the action based on the command is provided in the first-user interface. This allows the first user to easily grasp the details of the specific operation such as what type of the command was input by the second user.

A third disclosure is the computer system, wherein the notification control includes providing the notification of a timing when the second user input the operation.

According to the disclosure, in some embodiments, during the replacement play, the notification of the timing when the second user input the operation is provided in the first-user interface. This allows the first user to grasp the details of the specific operation such as at what timing the second user input the operation.

A fourth disclosure is the computer system, wherein the notification control includes displaying given information on the display screen of the first-user interface on which the game image is displayed during the replacement play.

According to the disclosure, in some embodiments, the notification of the details of the operation performed by the second user is provided by the display of the given information on the display screen of the first-user interface. This allows the first user to grasp the details of the operation performed by the second user, by watching the information displayed together with the game image.

A fifth disclosure is the computer system, wherein the notification control includes superimposing the given information on the game image.

According to the disclosure, in some embodiments, the information on the details of the operation performed by the second user is superimposed and displayed on the game image. This allows the first user to grasp the details of the operation performed by the second user without largely averting his/her eyes from the game image.

A sixth disclosure is the computer system, wherein the notification control includes displaying the given information outside the game image.

According to the disclosure, in some embodiments, the information on the details of the operation performed by the second user is displayed outside the game image. This avoids the game image from becoming hard to see due to overlapping of the information.

A seventh disclosure is the computer system, wherein the notification control includes vibrating a vibration section provided in the first-user interface or controlling output of a sound.

According to the disclosure, in some embodiments, the notification of the details of the operation performed by the second user is provided by vibration of the vibration section included in the first-user interface or sound output, which allows the first user to grasp the details of the operation performed by the second user without keeping the first user eye on the screen.

An eighth disclosure is the computer system, wherein the at least one processor or circuit is further programmed to

- determine whether a game situation during the replacement play satisfies a given notification condition, and
- the notification control includes causing the first-user interface to provide the notification if it is determined that the notification condition is satisfied.

According to the disclosure, in some embodiments, the notification of the details of the operation performed by the second user is provided if the game situation during the replacement play satisfies the given notification condition. That is, the notification is not always provided during the replacement play but is provided only in the game situation satisfying the notification condition. Examples of the notification condition include specific game situations predetermined in a game scenario such as arrival at a specific place, encounter with a specific character, and execution of a specific action, game situations estimated to be disadvantageous for the first user from the value of physical strength of the character operated by the first user or the like, game situations estimated to be difficult to handle for the first user from the first user's play history, game situations estimated to be difficult to handle for many users from other users' play histories, and the like.

A nineth disclosure is the computer system, wherein the at least one processor or circuit is further programmed to

- set the notification condition based on the first user's setting operation.

According to the disclosure, in some embodiments, the notification condition is set based on the first user's setting operation. This allows the first user to set, as the notification condition, which game situation he/she wishes to grasp the details of the operation performed by the second user during the replacement play, so that a notification is provided only in the set game situation.

A tenth disclosure is the computer system, wherein the at least one processor or circuit is further programmed to

- accept a notification request based on the first user's operation input during the replacement play, and
- the notification control includes causing the first-user interface to provide the notification if the notification request is accepted.

According to the disclosure, in some embodiments, the notification of the details of the operation performed by the second user is provided if the notification request from the first user is accepted during the replacement play. That is, the notification is not always provided during the replacement play, and the first user can allow the notification of the details of the operation performed by the second user, by inputting the notification request when the first user wishes to know the details of the operation performed by the second user during the replacement play.

An eleventh disclosure is the computer system as defined in claim 1, wherein the at least one processor or circuit is further programmed to

- perform a control to display a replay video of the replacement play on the display screen of the first-user interface, and
- the notification control includes causing the first-user interface to provide the notification during the display control of the replay video.

According to the disclosure, in some embodiments, the notification of the details of the operation performed by the second user is also provided during the replacement play, as during the gameplay, at the time of display of the replay video of the replacement play on the display screen of the first-user interface. This allows the first user to review the details of the operation performed by the second user, by watching the replay video.

A twelfth disclosure is the computer system as defined in claim 1, wherein the at least one processor or circuit is further programmed to:

- store data of the gameplay performed by the first user using the first-user interface in a predetermined storage section; and
- based on the data stored in the storage section, store data of the replacement play performed by the second user using the second-user interface and data indicating the operation details based on the operation input by the second user during the replacement play in the storage section.

According to the disclosure, in some embodiments, in a game in which the second user can perform the replacement play in place of the past gameplay performed by the first user, the data of the replacement play and the data indicating the operation details based on the operation input by the second user can be stored in a predetermined storage section. Based on the data stored in the storage section, the details of the operation performed by the second user during the replacement play can be presented so as to be grasped by an arbitrary user at an arbitrary timing.

A thirteenth disclosure is a game system comprising:

a server system that is any one of the above computer systems;

the first-user interface; and the second-user interface.

According to the disclosure, in some embodiments, it is possible to realize a game system that provides the foregoing operations and effects.

Exemplary embodiments are described below. Note that the following exemplary embodiments do not in any way limit the scope of the content defined by the claims laid out herein. Note also that all of the elements described in the present embodiment should not necessarily be taken as essential elements.

Preferred embodiments of the present disclosure are hereinafter described referring to the drawings. However, the present disclosure is not limited by the following embodiments, and the modes to which the present disclosure is applicable are not limited to the following embodiments. In addition, identical referential numerals are given to identical components in the drawings.

[Game System]

FIG. 1 is a diagram illustrating an example of a configuration of a game system in the present embodiment. Referring to FIG. 1, a game system 1 of the present embodiment includes a server system 1000 connectable to a communication network N, and a plurality of user terminals 1500 (1500*a*, 1500*b*, . . . ) that can access the server system 1000 via the communication network N to communicate with the server system 1000.

The communication network N refers to a communication channel that enables data communication. Specifically, the communication network N includes a communication network such as a local area network (LAN) using a private line (a private cable) for direct connection, Ethernet (registered trademark), or the like, a telecommunication network, a cable network, and the Internet. A communication method may be a cable communication method or a wireless communication method.

The server system 1000 has a main body device 1010, a keyboard 1002, a display 1004, and a storage 1030. The server system 1000 is a computer system in which a control board 1020 is mounted in the main body device 1010.

The control board 1020 includes various processors such as a central processing unit (CPU) 1021, a graphics processing unit (GPU), and a digital signal processor (DSP), various IC memories 1022 such as VRAM, RAM, and ROM, and a communication device 1023. The control board 1020 may be implemented partially or entirely by an application specific integrated circuit (ASIC), a field-programmable gate array (FPGA), or a system on a chip (SoC). These arithmetic circuits can be said to be processors. The server system 1000 implements various services for managing the game of the present embodiment by the control board 1020 performing calculation processes based on a predetermined program and data. For example, the server system 1000 implements a user management function relating to user registration and the like, and a game management function of providing data necessary for users to perform gameplay on the user terminals 1500 (1500*a*, 1500*b*, . . . ) and managing execution control of the game on the user terminals 1500 (1500*a*, 1500*b*, . . . ). That is, the game according to the present embodiment is implemented as a kind of client-server online game.

The server system 1000 is not limited to a single server configuration illustrated in FIG. 1, and may be configured such that a plurality of blade servers sharing functions are connected via an internal bus to perform data communication. Furthermore, a plurality of independent servers, disposed in locations distant from each other, may perform data communications with each other via the communication line to function as the server system 1000 as a whole.

The user terminals 1500 (1500*a*, 1500*b*, . . . ) are computer systems individually usable by the users for gameplay, and are electronic devices (electronic apparatus) that can access the server system 1000 via the communication network N to implement an online game. The user terminal 1500 according to the present embodiment is described as a device called as a smartphone as hardware. The user terminal 1500 may also be a portable game device, a game controller, a personal computer, a tablet computer, a wearable computer, a consumer game device, an arcade game apparatus, or the like. The user terminal 1500 is not limited to a single device as illustrated in FIG. 1 and may be configured by a plurality of devices to integrally function in cooperation.

[Game Overview]

Figure 2:
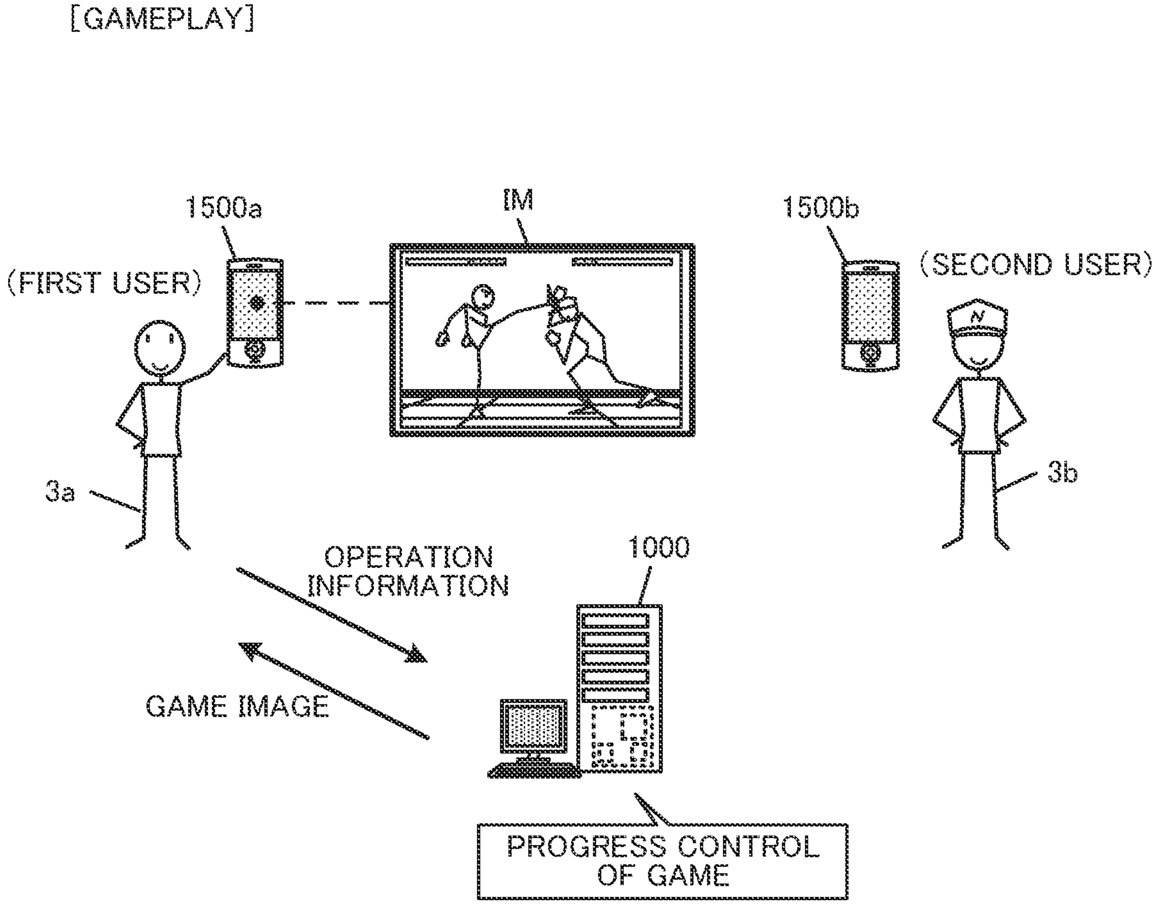
FIG. 2 is a diagram illustrating outline of gameplay.

FIG. 2 is a diagram illustrating the overview of the game in the present embodiment. As illustrated in FIG. 2, the game played in the game system 1 is basically a single-play online game in which a user 3*a* (hereinafter, referred to as "first user" as appropriate) performs gameplay by operating his/her user terminal 1500*a* that is a first-user interface (hereinafter, referred to as "first terminal" as appropriate). The server system 1000 performs progress control of the game based on operation information of the first user acquired from the first terminal and displays a game image IM in accordance with the progress of the game on the first terminal.

Figure 3:
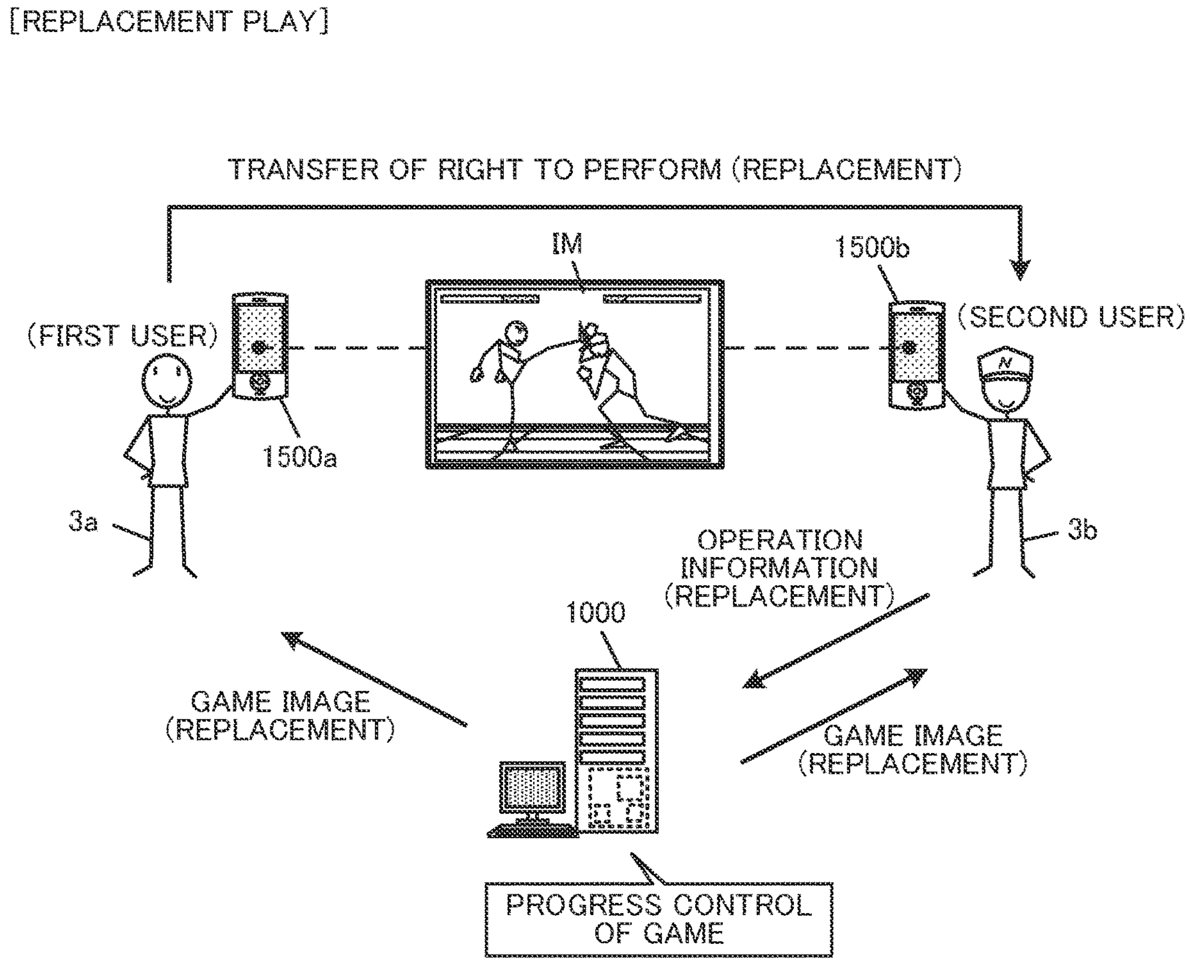
FIG. 3 is a diagram illustrating outline of replacement play.

In the game of the present embodiment, as illustrated in FIG. 3, replacement play can be performed at an arbitrary timing during the game such that the right to perform gameplay is transferred from the first user to another user 3*b* (hereinafter, referred to as "second user" as appropriate). In the replacement play, the second user has the right to perform gameplay and operates his/her own user terminal 1500*b* that is a second-user interface (hereinafter, referred to as "second terminal" as appropriate) to perform gameplay in place of the first user. During the replacement play, the first user cannot perform gameplay by operating the first terminal.

The server system 1000 performs progress control of the game based on the operation information of the second user acquired from the second terminal, and displays the game image IM in accordance with the progress of the game on the respective display screens of the first terminal and the second terminal. That is, during the replacement play, the second user operates the second terminal to perform gameplay while watching the game image IM displayed on the display screen of the second terminal, while the first user watches the gameplay performed by the second user, which is displayed as the game image IM on the display screen of the first terminal. In the replacement play, the first user and the second user share not only the game image IM but also other elements relating to the gameplay such as game sounds and BGM.

[Game Screen]

Figure 4:
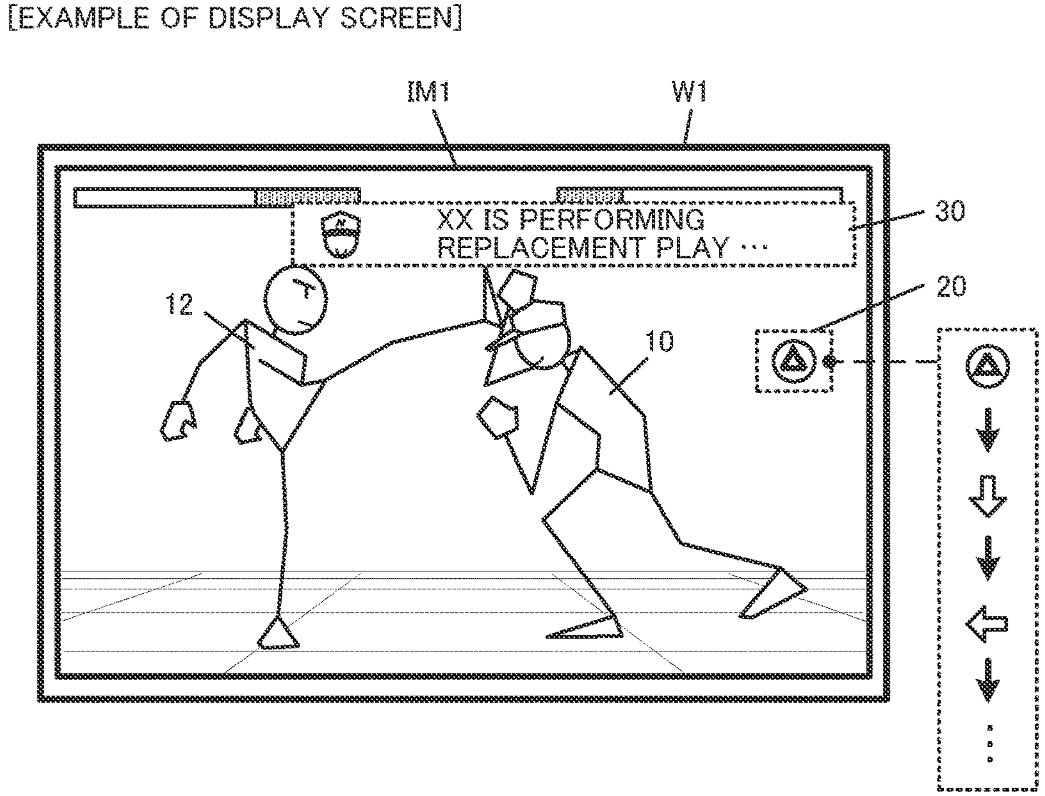
FIG. 4 is a diagram illustrating an example of a game screen during replacement play.

FIG. 4 illustrates an example of a game screen displayed on the first terminal in the replacement play. FIG. 4 illustrates an example of a fighting match game in which the first user uses the first terminal to operate a player character 10 and fights against a computer-controlled non-playable character 12. As one of features of the present embodiment, displayed on a game screen W1 on the first terminal during the replacement play are a game image IM1, a command 20 input by the second user operating the player character 10 of the first user, and a message 30 indicating that the replacement play is being performed by the second user. The display of the command 20 is an example of a notification of the operation details based on the operation input by the second user during the replacement play, and the operation details are indicated by the display of the command 20 that is given information. Real-time display of the command 20 input by the second user indicates the timing of the operation input by the second user. Therefore, the first user can see the command 20 and its display timing displayed on the game screen W1 of his/her first terminal to easily have a grasp on what operation was input by the second user at what timing and use the knowledge for subsequent gameplay.

In the example of FIG. 4, the command 20 input by the second user is displayed in real time. Alternatively, a predetermined number of latest commands may be updated and displayed in time series or commands input within a predetermined number of past seconds (for example, three seconds) may be updated and displayed in time series. The game screen displayed on the second terminal operated by the second user is a game screen on which the same game image IM1 as that on the first terminal is displayed. The command 20 and the message 30 may not be displayed on the game screen on the second terminal unlike on the first terminal or may be displayed like on the first terminal.

Figure 5:
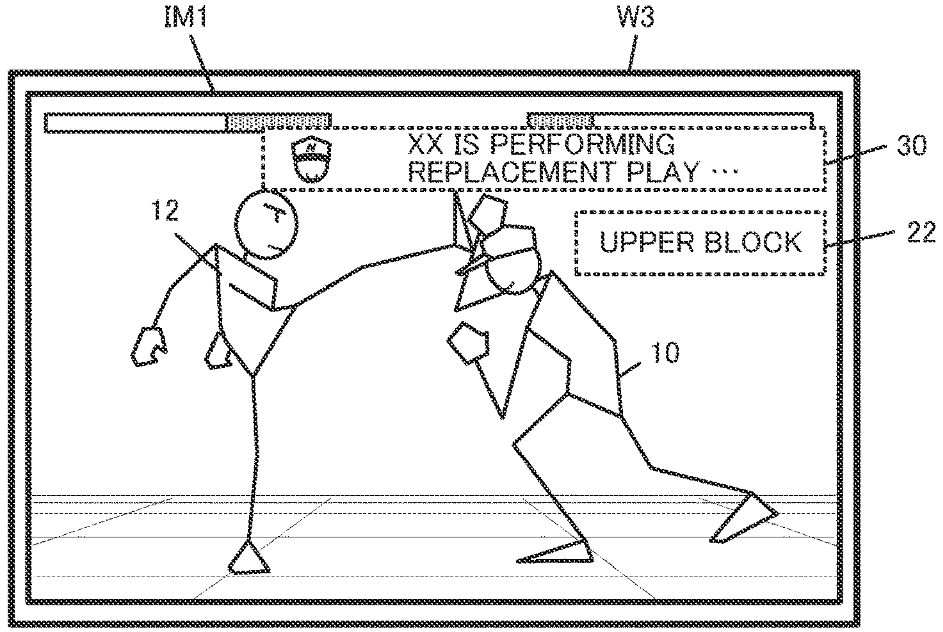
FIG. 5 is a diagram illustrating an example of a game screen during replacement play.
Figure 6:
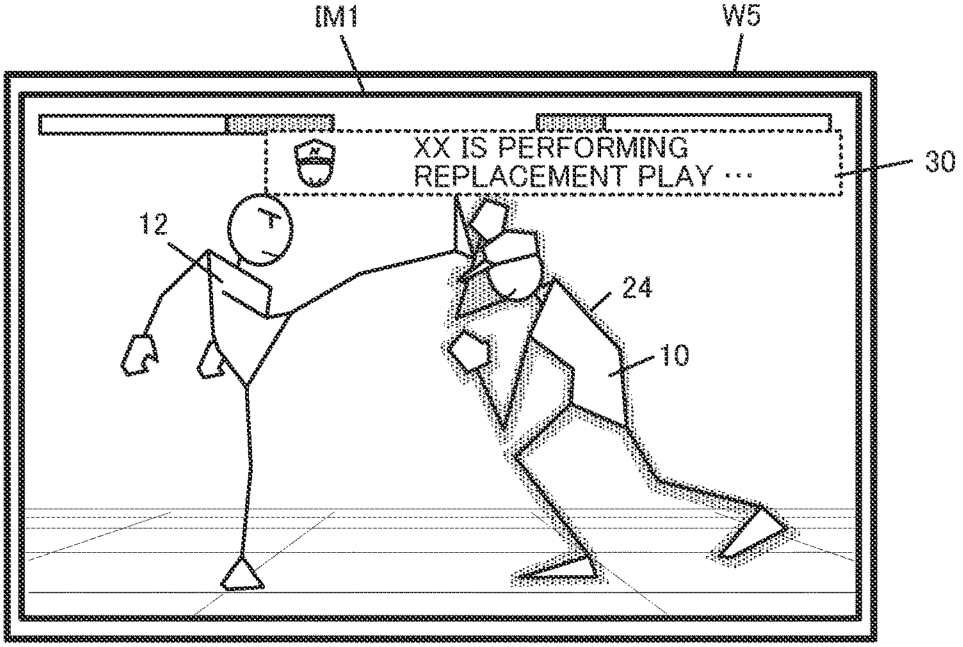
FIG. 6 is a diagram illustrating an example of a game screen during replacement play.

FIGS. 5 and 6 illustrate other examples of a game screen displayed on the first terminal in the replacement play. Displayed on a game screen W3 illustrated in FIG. 5 is an action name 22 based on the command input by the second user as another example of information indicating the operation details based on the operation input by the second user during the replacement play. The action name 22 is displayed in real time at the timing when the second user inputs operation of the command corresponding to the action to indicate the details and timing of the operation performed by the second user. The actions to be activated by a plurality of successive commands may be easier to grasp by displaying the names of the actions activated rather than successively displaying the plurality of commands.

On a game screen W5 illustrated in FIG. 6, an effect 24 is displayed on the player character 10 at the timing when the second user inputs operation as another example of information indicating the operation details based on the operation input by the second user during the replacement play. The effect 24 is displayed in real time at the timing when the second user inputs operation of the command to indicate the timing of the operation input by the second user.

Figure 7:
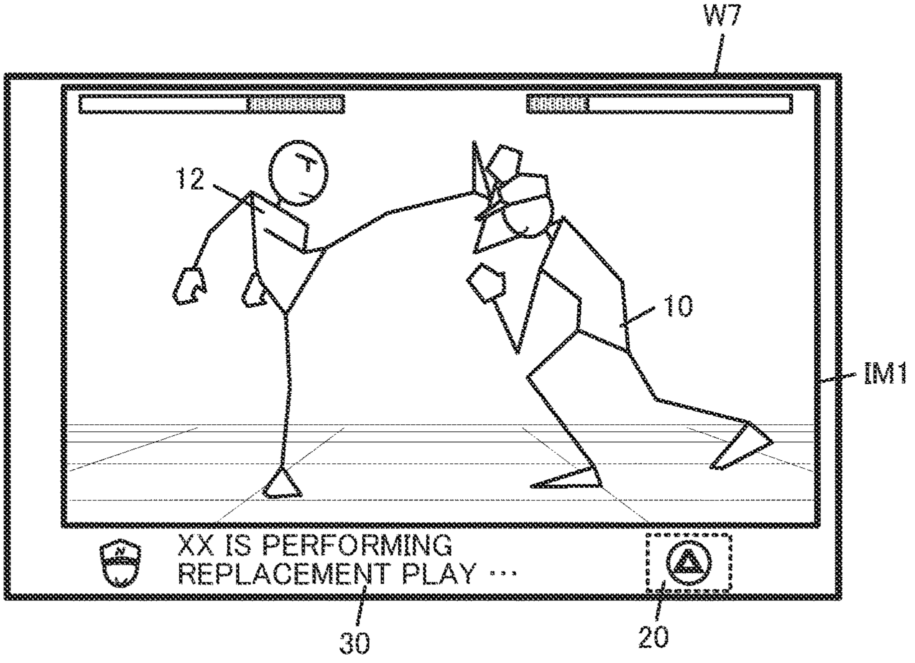
FIG. 7 is a diagram illustrating an example of a game screen during replacement play.

Each of FIGS. 4 to 6 illustrates a game screen in which the information indicating the operation details based on the operation input by the second user during the replacement play is superimposed and displayed on the game image IM1. The information may be displayed outside the game image IM1 as illustrated in a game screen W7 of FIG. 7. Depending on the content of the game, the motion of the player character 10 may become hard to see because the information superimposed on the game image IM1 overlaps with the player character 10. However, displaying the information outside the game image IM1 can avoid such a situation.

Figure 8:
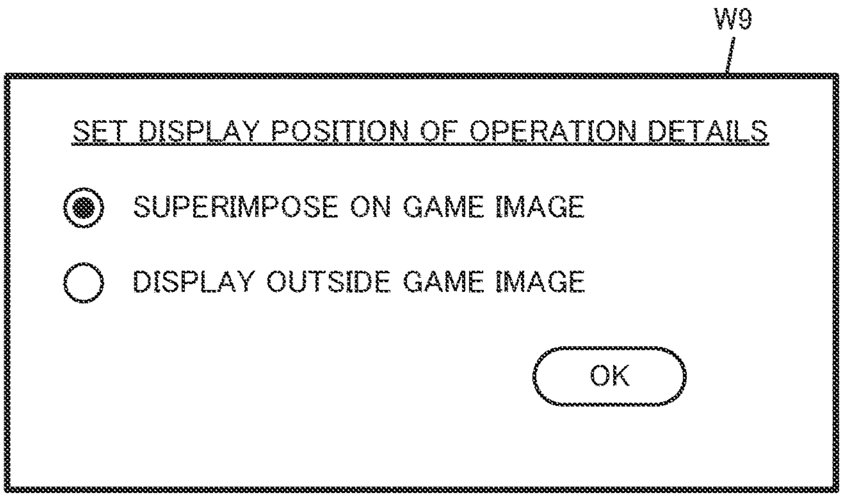
FIG. 8 is a diagram illustrating an example of a setting screen for a display position.

The first user may select the display position of the information indicating the operation details based on the operation input by the second user during the replacement play, between superimposition on the game image IM1 and outside the game image EVIL Specifically, prior to execution of the gameplay, a setting screen W9 is displayed on the first terminal as in an example illustrated in FIG. 8. The setting screen W9 presents two options: "superimpose on game image" and "display outside game image" as candidates for display positions, and the first user can select one from the two options.

Figure 9:
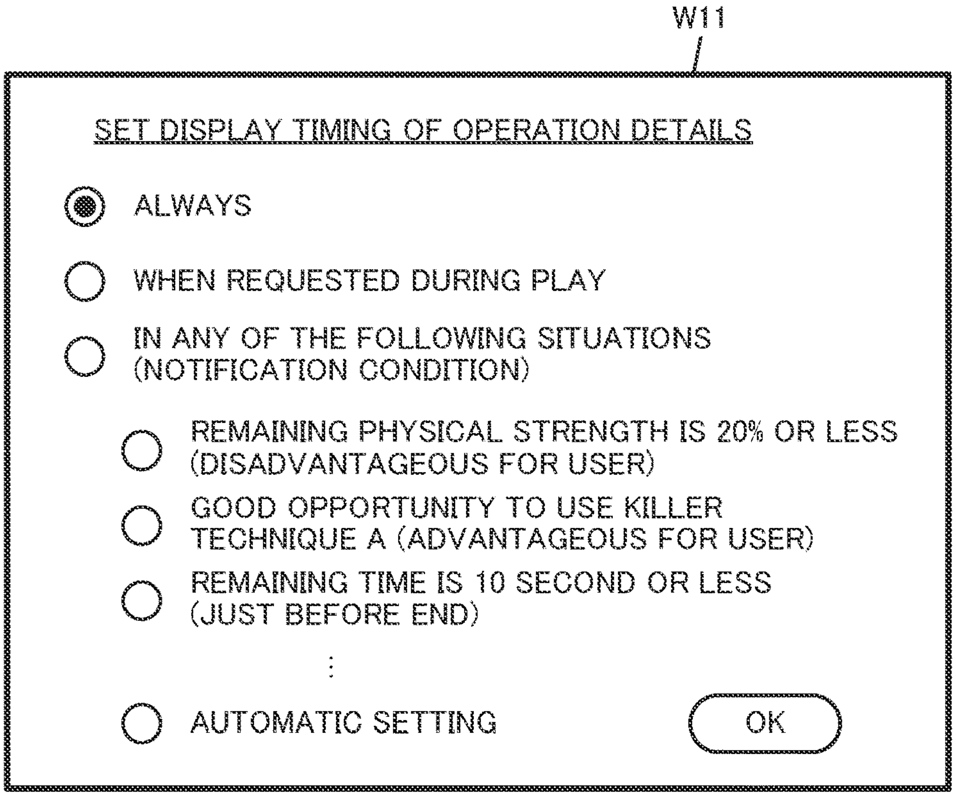
FIG. 9 is a diagram illustrating an example of a setting screen for display timing.

The information indicating the operation details based on the operation input by the second user during the replacement play may not be always displayed during the replacement play but may be displayed at an arbitrary timing. Specifically, prior to execution of the gameplay, a setting screen W11 is displayed on the first terminal as in an example illustrated in FIG. 9. As candidates for display timings, the setting screen W11 presents three options: "always", "when requested during play", and "when notification condition is satisfied", and the first user can select one from the three options.

The first option "always" indicates that the information indicating the details of the operation performed by the second user is always displayed during the replacement play.

Figure 10:
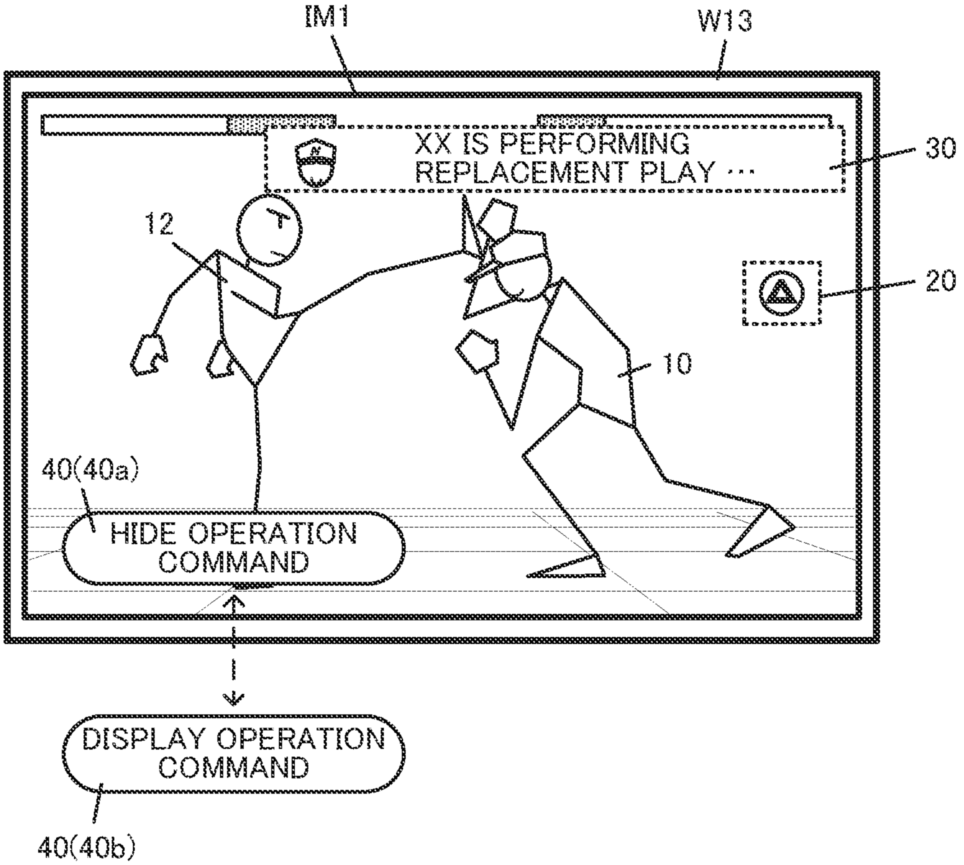
FIG. 10 is a diagram illustrating an example of a game screen during replacement play.

The second option "when requested during play" indicates that the information indicating the details of the operation performed by the second user is displayed in response to the request from the first user during the replacement play. If this option is selected, as illustrated in FIG. 10, for example, an icon 40 (40*a*, 40*b*) for requesting notification of the operation details is displayed on the game screen W13 on the first terminal during the replacement play. The icon 40 includes an icon 40*a* with which the displayed command 20 is hidden and an icon 40*b* with which the command 20 is displayed to request the notification of the operation details. The first user can select the icon 40 (40*a*, 40*b*) to switch between displaying and hiding the information indicating the operation details based on the operation input by the second user.

Returning to FIG. 9, the third option "when notification condition is satisfied" specifies that the information indicating the details of the operation performed by the second user is to be displayed when the game situation in the replacement play satisfies a given notification condition. Examples of the notification condition include: game situations determined in accordance with the user's gameplay such as a situation estimated to be disadvantageous or advantageous to the first user from a parameter such as the value of the physical strength of the player character operated by the first user, relative relationships with other characters, or progress status of the play, a situation estimated to be difficult to handle for the first user from the first user's play history, a situation estimated to be difficult to handle for many users from other users' play histories; a specific game situation predetermined in a game scenario such as just before the end of the gameplay, arrival at a specific place, encounter with a specific character, or execution of a specific action, and the like. The first user can select and set an arbitrary number of notification conditions from the notification conditions listed above. Further, the first user can cause the notification condition(s) to be automatically selected and set instead of selecting the notification condition(s) by himself/herself.

As the information indicating the details of the operation input by the second user during the replacement play, only the details of the operation relating to a predetermined command may be displayed. The specific command whose operation details are to be displayed may be selected by the first user or may be automatically selected. For example, a command estimated to be hard to use for the first user from the first user's play history or a command for a killer technique to be a big scene may be selected as a specific command. As a manner to display the operation details relating to the specific command, only the operation details of the specific command may be displayed without display of other operation details, or the operation details relating to the specific command may be made conspicuous by highlighting. As a manner of highlighting, the text or graphics may be darkened and bolded, the degree of transparence of the display may be changed, or an effect may be added.

Figure 11:
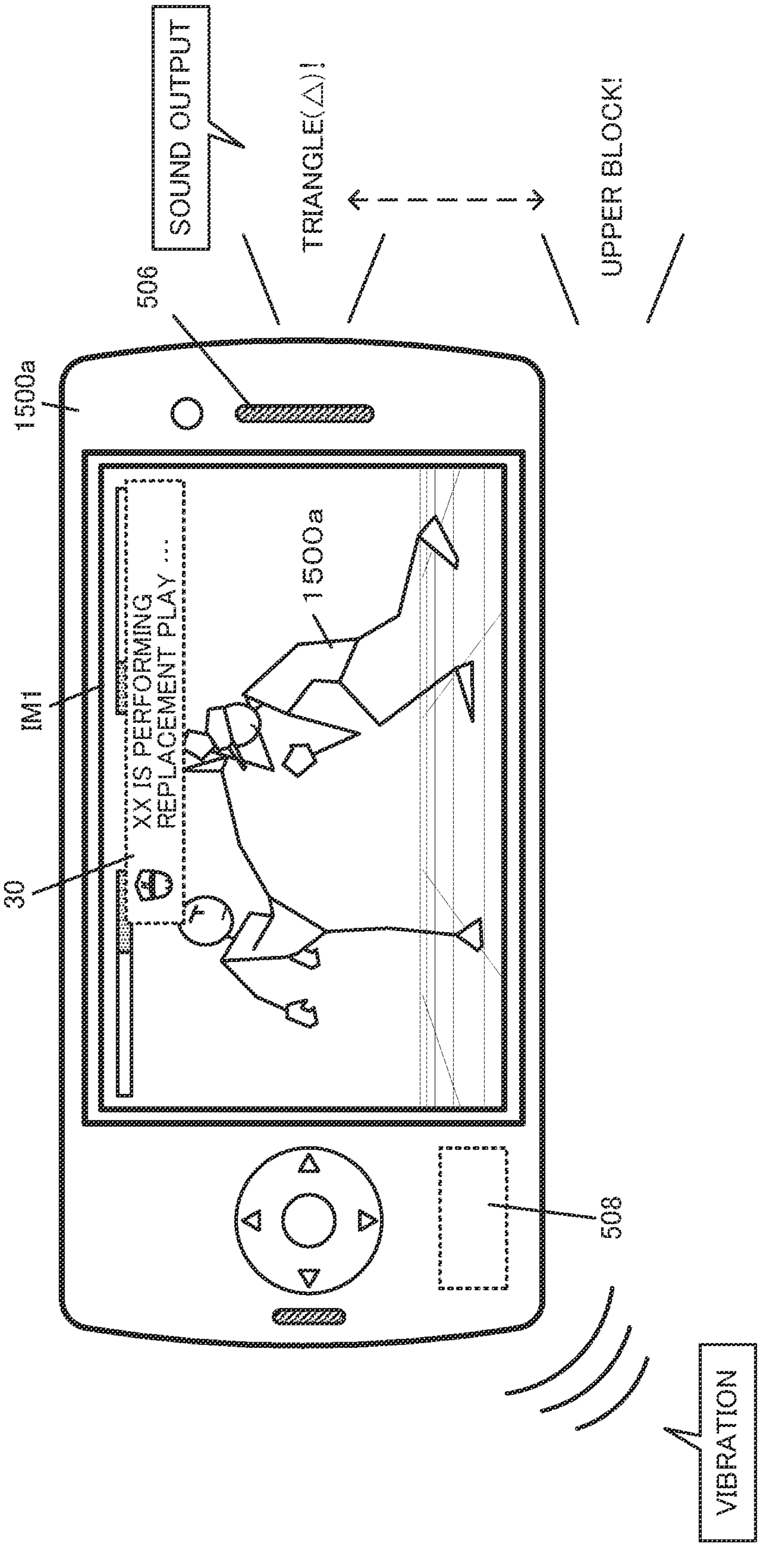
FIG. 11 is a diagram illustrating another example of notification.

The notification indicating the operation details based on the operation input by the second user during the replacement play may be provided by sound output or vibration instead of display on the game screen. Specifically, as illustrated in FIG. 11, the command input by the second user or the name of the action based on the command may be output by sound or a predetermined notification sound may be output at the timing of input of the command from a sound output section 506 such as a speaker included in the first terminal. Alternatively, a vibration section 508 such as a vibration motor included in the first terminal may be vibrated at the timing of operation input by the second user or in a vibration pattern in accordance with the input command or the action based on the command. It is also possible to make the first user select a manner of providing the notification of the details of the operation performed by the second user from any of the display on the game screen, sound output, and vibration. The manner of providing the notification may be changed depending on whether the operation details relate to a specific command.

[Functional Configuration]

Figure 12:
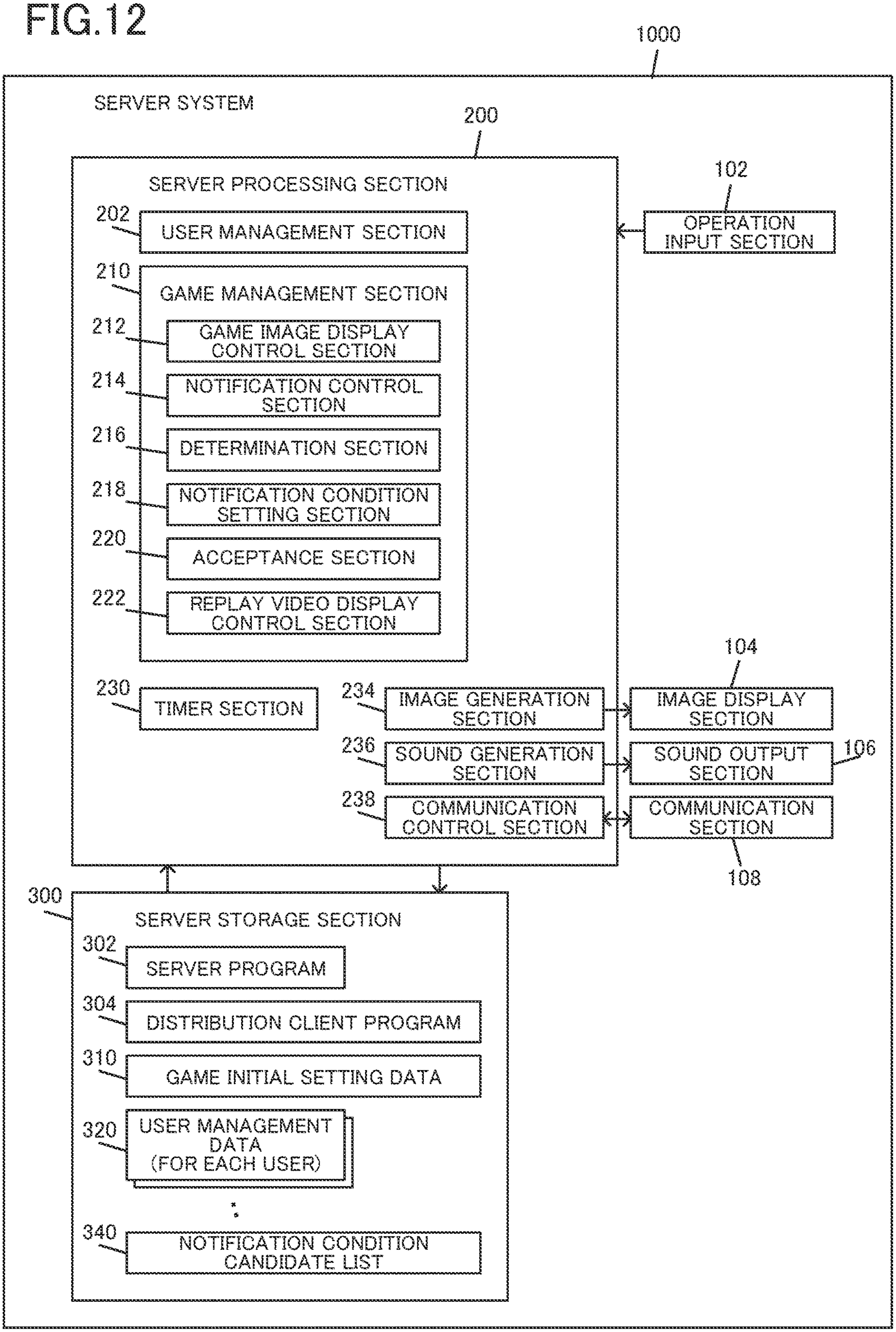
FIG. 12 is a diagram illustrating a functional configuration of a server system.

FIG. 12 is a block diagram illustrating an example of a functional configuration of the server system 1000. According to FIG. 12, the server system 1000 includes an operation input section 102, an image display section 104, a sound output section 106, a communication section 108, a server processing section 200, and a server storage section 300.

The operation input section 102 outputs an operation input signal to the server processing section 200 in response to various operation inputs for management of the server system 1000. The keyboard 1002 illustrated in FIG. 1 corresponds to the operation input section 102.

The server processing section 200 is implemented by, for example, a processor such as a CPU or GPU and electronic components such as an ASIC and IC memory. The server processing section 200 controls input/output of data between the functional sections including the operation input section 102 and the server storage section 300. The server processing section 200 performs various calculation processes based on predetermined programs and data, operation input signals from the operation input section 102, data received from the user terminal 1500, or the like, thereby to entirely control the operations of the server system 1000. The control board 1020 illustrated in FIG. 1 corresponds to the server processing section 200. The server processing section 200 also has a user management section 202, a game management section 210, a timer section 230, an image generation section 234, a sound generation section 236, and a communication control section 238. Other functions may be included as appropriate.

The user management section 202 performs various processes relating to the user registration management. In the present embodiment, the user management section 202 has the functions of providing unique user accounts to registered users, managing registration information for registering and managing personal information by user account, and managing game data. Note that any other management functions for data associated with the accounts can be included as appropriate. The user management section 202 assigns a unique account (user ID) to a user 3 having undergone a user registration procedure and generates user management data 320, thereby to manage the data relating to each user 3.

Figure 13:
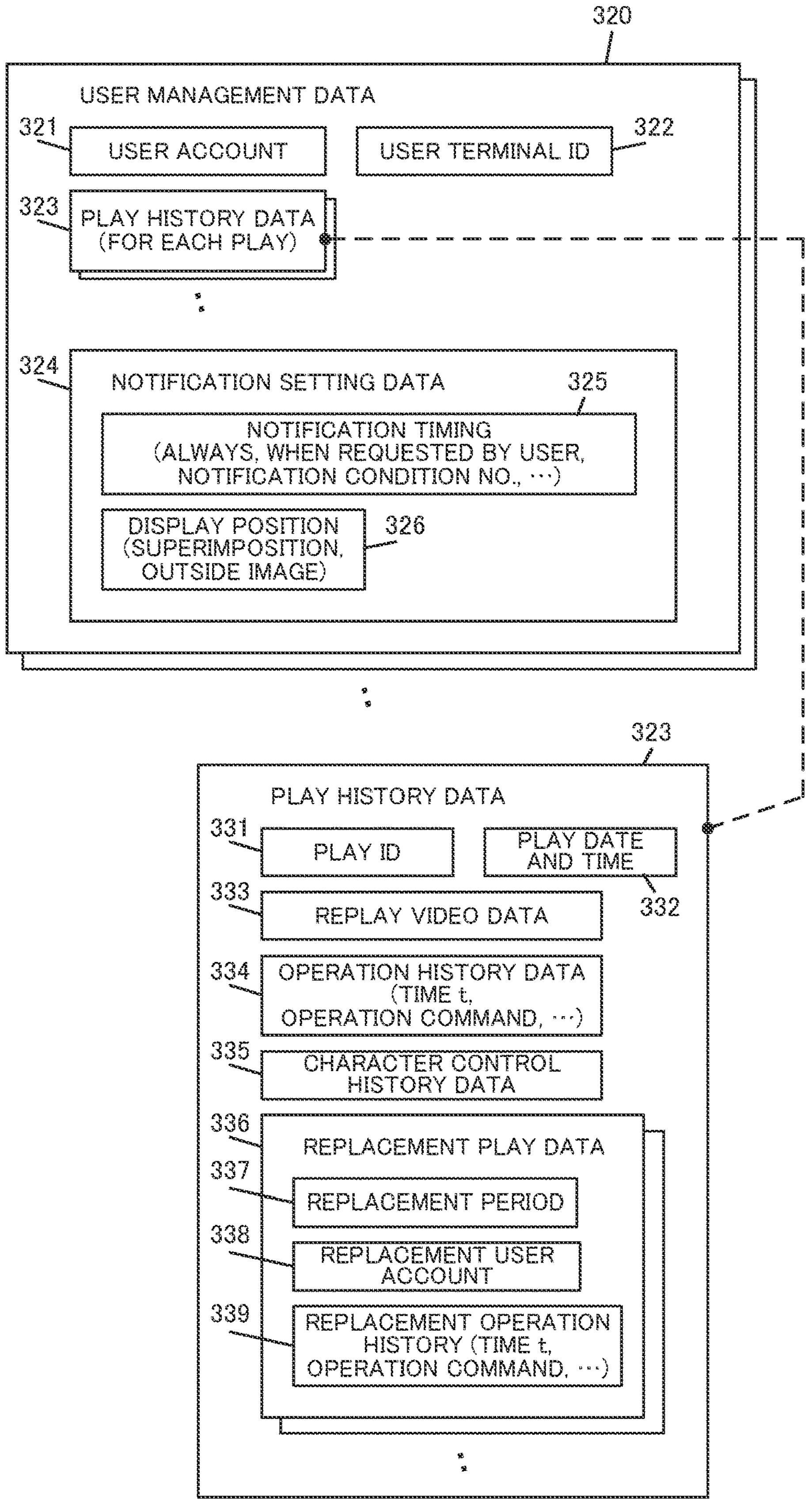
FIG. 13 is a diagram illustrating an example of user management data.

FIG. 13 is a diagram illustrating an example of the user management data 320. According to FIG. 13, the user management data 320 is generated for each registered user, and includes a user account 321 assigned to the user, a user terminal ID 322 of the user terminal 1500 of the user, play history data 323, and notification setting data 324.

The user account 321 includes the unique user ID assigned to the user, and a user name and a password arbitrarily set by the user.

The play history data 323 is generated for each gameplay, and includes a play ID 331 for identifying the gameplay, play date and time 332 when the gameplay was performed, replay video data 333, operation history data 334, character control history data 335, and replacement play data 336.

The replay video data 333 is video data in which video of the gameplay was recorded, which is generated for replay. The operation history data 334 is a history of operation commands input by the first user in the gameplay, and is data in which the operation commands are accumulated in association with the time in the game progress calculation. The character control history data 335 is a history of control data of characters including the first user's player character in the gameplay, and, for example, is data in which the positions and postures of the characters are accumulated in association with the time.

The replacement play data 336 is generated at every replacement play performed in the gameplay, and includes a replacement period 337, a replacement user account 338 that is the user account of the second user having performed the replacement play, and a replacement operation history 339. The replacement period 337 is a period of the replacement play, and is for example, a period from a point in time of the start to a point in time of the end of the replacement play with respect to the point in time of the start of the gameplay. The replacement operation history 339 is a history of operation commands input by the second user having performed the replacement play, and is data in which the operation commands are accumulated in association with the time in the game progress calculation.

The notification setting data 324 contains settings relating to the notification of the details of the operation performed by the second user during the replacement play in the gameplay of the user, and includes a notification timing 325 and a display position 326. The notification timing 325 is a setting of timing of notification, which indicates whether to always provide a notification, provide a notification when requested by the user, or provide a notification when a notification condition is satisfied. The notification condition is selected from a notification condition candidate list 340. The notification condition candidate list 340 is a list of a plurality of notification conditions in association with condition No. that are identification numbers as in an example illustrated in FIG. 14. The notification timing 325 is set by the user on the setting screen W11 as in an example illustrated in FIG. 9. The display position 326 is a setting on whether information to be displayed as notification is to be superimposed on the game image or displayed outside the game image. The display position 326 is set by the user on the setting screen W9 as in an example illustrated in FIG. 8.

Returning to FIG. 12, the game management section 210 uses game initial setting data 310 to perform various processes relating to the execution control of the gameplay on the user terminal 1500. The game initial setting data 310 contains various types of initial setting data necessary for execution control of the game, including, for example, initial setting data on a game space, characters and items appearing in the game. The game management section 210 has a game image display control section 212, a notification control section 214, a determination section 216, a notification condition setting section 218, an acceptance section 220, and a replay video display control section 222.

The game image display control section 212 performs a control to display the game image during replacement play on the first terminal and the second terminal. That is, during the replacement play performed by the second user in the gameplay of the first user, the game image display control section 212 generates the game image IM in accordance with the game progress controlled based on the operations performed by the second user, and transmits the game image IM to the first terminal and the second terminal for display on the game screen (see FIG. 2).

The notification control section 214 causes the first terminal to provide notifications indicating the operation details based on the operations input by the second user during the replacement play. As the operation details to be notified, the commands input by the second user or the actions based on the commands may be notified (see FIGS. 4 and 5), or the timings of operations input by the second user may be notified (see FIG. 6).

As a manner of providing a notification, given information can be displayed on the first terminal on which the game image is displayed during the replacement play. The given information may be superimposed on the game image (see FIGS. 4 to 6) or may be displayed outside the game image (see FIG. 7). Where to display is in accordance with the setting of the display position 326 in the user management data 320 of the first user (see FIG. 13). Alternatively, the notification may be provided by sound or the notification may be provided by vibrating the vibration section 508 included in the first terminal (see FIG. 11).

As the timing of notification, if the determination section 216 determines that a notification condition is satisfied, the notification may be provided on the first terminal, or if the acceptance section 220 accepts a notification request from the first user, the notification may be provided on the first terminal. The notification timing is in accordance with the setting of the notification timing 325 in the user management data 320 of the first user (see FIG. 13).

Otherwise, the notification may be provided on the first terminal during the display control of the replay video by the replay video display control section 222.

The determination section 216 determines whether the game situation during the replacement play satisfies a given notification condition. Specifically, if the setting of the notification timing 325 in the user management data 320 of the first user is "when notification condition is satisfied", the determination section 216 determines whether the game situation during the replacement play performed by the second user satisfies the notification condition set in the notification timing 325.

The notification condition setting section 218 sets the notification condition based on the first user's setting operation. Specifically, prior to the execution control of the gameplay, for example, the notification condition setting section 218 displays the setting screen W11 on the first terminal as in an example illustrated in FIG. 9, and sets the timing for notification of the details of the operation performed by the second user during the replacement play and the notification condition in accordance with the first user's operation input on the screen.

The acceptance section 220 accepts a notification request based on the first user's operation input during the replacement play. Specifically, if the setting of the notification timing 325 in the user management data 320 of the first user is "when requested by the user", the icon 40 (40*a*, 40*b*) for requesting the notification of the operation details is displayed on the game screen W13 on the first terminal during the replacement play as in an example illustrated in FIG. 10. Then, the selection of the icon 40*b* by the first user is regarded as acceptance of the notification request based on the operation input by the first user.

The replay video display control section 222 performs a control to display the replay video of the replacement play on the first terminal. The replay video can be used, for example, in such a manner that the replay video data 333 in the user management data 320 of the first user is transmitted for replay and display to the first terminal, the data of the replay video is generated by reproducing the gameplay using the operation history data 334 or the character control history data 335 and transmitted to the first terminal, or the operation history data 334 or the character control history data 335 is transmitted to the first terminal and the gameplay is reproduced on the second terminal.

The timer section 230 uses a system clock to measure the current date and time or the like.

The image generation section 234 can generate images related to the system management for the server system 1000, game images (or data for displaying the game images on the user terminal 1500), and the like. The image related to the system management can be output to the image display section 104. The image display section 104 displays various images for system management based on the image signals input from the image generation section 234. For example, the image display section 104 can be implemented by an image display device such as a flat panel display, a projector, or a head-mounted display. The display 1006 illustrated in FIG. 1 corresponds to the image display section 104.

The sound generation section 236 is implemented by an IC or software that generates sound data and performs decoding, and generates or decodes sound data on operation sound and background music (BGM) related to system management for the server system 1000 and the gameplay. The sound generation section 236 outputs a sound signal to the sound output section 106. The sound output section 106 emits sounds based on the input sound signal. A speaker (not illustrated) included in the main body device 1010 or the display 1006 in FIG. 1 corresponds to the sound output section 106.

The communication control section 238 performs data processing related to data communication, and implements data exchange with an external device through the communication section 108. The communication section 108 connects to the communication network N to implement communication. For example, the communication section 108 is implemented by a wireless communication device, a modem, a terminal adaptor (TA), a jack for wired communication cable, a control circuit, or the like. A communication device 1016 illustrated in FIG. 1 corresponds to the communication section 108.

The server storage section 300 stores programs and various types of data for implementing various functions for causing the server processing section 200 to comprehensively control the server system 1000. The server storage section 300 is used as a work area for the server processing section 200, and temporarily stores results of calculations executed by the server processing section 200 in accordance with various programs. The server storage section 300 is implemented by an IC memory such as a RAM or a ROM, a magnetic disk such as a hard disk, an optical disc such as a compact disc read-only memory (CD-ROM) or a digital video disc (DVD), an online storage, or the like. The server storage section 300 stores a server program 302 for implementing various functional sections of the server system 1000, a distribution client program 304, the game initial setting data 310, the user management data 320, and the notification condition candidate list 340.

The distribution client program 304 is an original of a game client program that is provided to the user terminal 1500.

Figure 15:
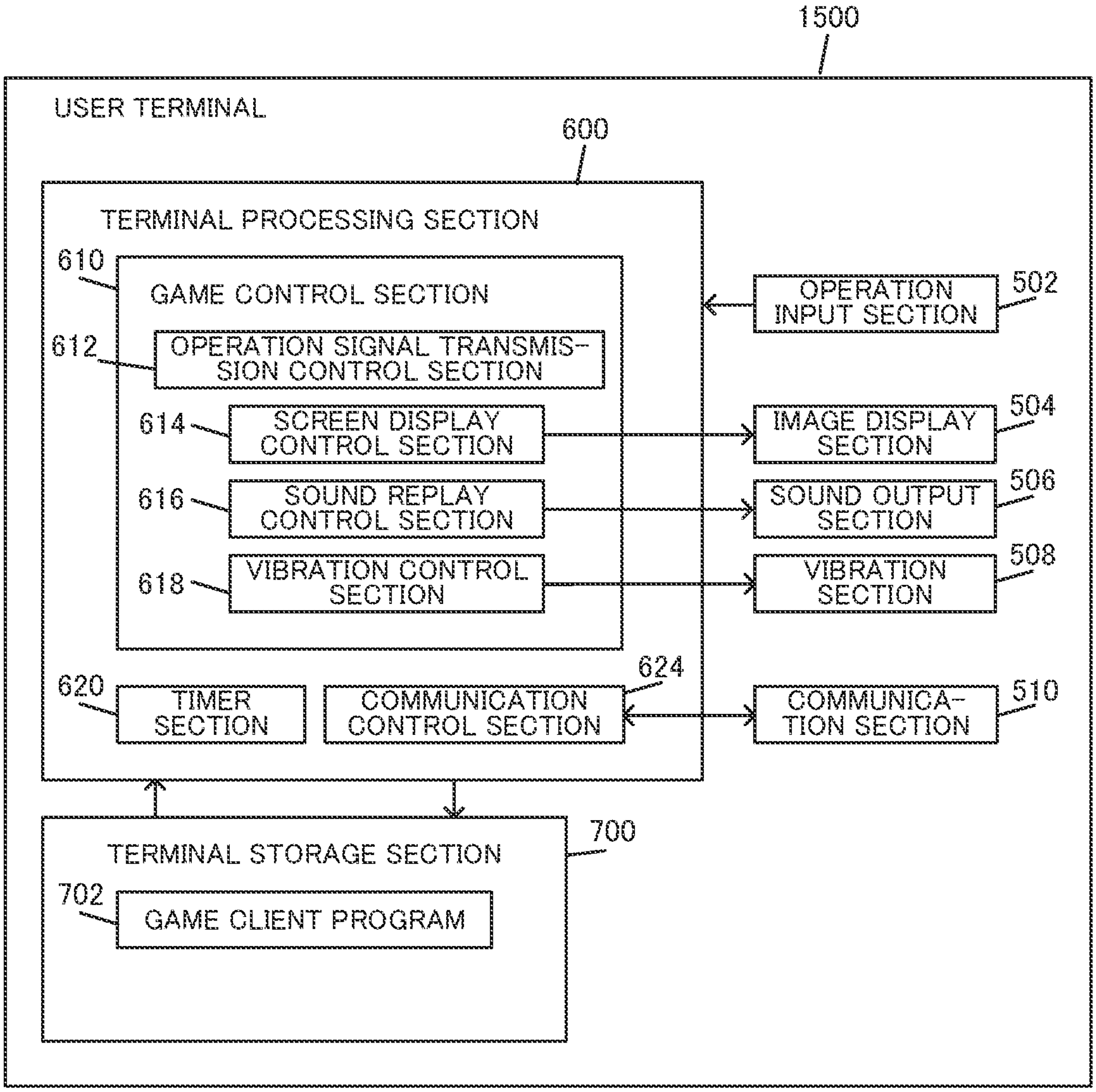
FIG. 15 is a diagram illustrating a functional configuration of a user terminal.

FIG. 15 is a block diagram illustrating an example of a functional configuration of the user terminal 1500. Referring to FIG. 15, the user terminal 1500 includes an operation input section 502, an image display section 504, a sound output section 506, a vibration section 508, a communication section 510, a terminal processing section 600, and a terminal storage section 700.

The operation input section 502 outputs an operation input signal, based on various operations input by the user, to the terminal processing section 600. The operation input section 502 can be implemented, for example, by a push switch, a joystick, a touch pad, a track ball, an accelerometer, a gyro, or a charge-coupled device (CCD) module.

The terminal processing section 600 is implemented, for example, by electronic components such as processors and an IC memory. The terminal processing section 600 controls input/output of data between the functional sections including the operation input section 502 and the terminal storage section 700. Examples of the processor include centralized arithmetic calculation devices such as a CPU and a GPU, and arithmetic circuits such as ASIC and FPGA. The terminal processing section 600 executes various calculation processes based on a predetermined program, data, and operation input signals from the operation input section 502, and data received from the server system 1000 to control the operations of the user terminal 1500. The terminal processing section 600 also has a game control section 610, a timer section 620, and a communication control section 624.

The game control section 610 includes an operation signal transmission control section 612, a screen display control section 614, a sound replay control section 616, and a vibration control section 618, and controls execution of the gameplay under control of the server system 1000.

The operation signal transmission control section 612 performs a process for transmitting an operation signal in accordance with the operation performed on the operation input section 502 to the server system 1000.

The screen display control section 614 performs a control to display a game screen based on various types of image data received from the server system 1000. For example, the screen display control section 614 can be implemented, for example, by a processor such as a CPU or a DSP, a video signal IC, a program such as a video codec, or a drawing frame IC memory such as a frame buffer. The screen display control section 614 generates an image of one game screen in one frame time (e.g., 1/60 second) based on various kinds of data received from the server system 1000, and outputs an image signal of the generated game screen to the image display section 504. In the present embodiment, the screen image display control section 614 is configured to generate game screen images in the server system 1000, but can be configured to generate the game screen images on the user terminal 1500.

The image display section 504 displays various game images based on the image signals input from the screen display control section 614. For example, the image display section 504 can be implemented by an image display device such as a flat panel display, a projector, or a head-mounted display.

The sound replay control section 616 performs a control to emit game sounds (for example, sound effects, BGM, lines uttered by voice actors, and the like) based on various types of sound data received from the server system 1000. For example, the sound replay control section 616 is implemented by a processor such as a DSP or a sound synthesizing IC, an audio codec for replaying a sound file, or the like, and generates sound signals for various sounds such as sound effects, BGM, various types of operation sounds, lines uttered by voice actors, and the like related to the game, and outputs the signals to the sound output section 506.

The sound output section 506 outputs sound effects and BGM based on the sound signals input from the sound replay control section 616. For example, the sound output section 506 can be implemented by a sound output device such as a speaker.

The vibration control section 618 performs a control to generate vibration based on various types of vibration data received from the server system 1000. The vibration section 508 generates vibration based on a vibration signal input from the vibration control section 618. For example, the vibration section 508 can be implemented by a vibration device such as a vibration motor.

The communication control section 624 performs data processing related to data communication, and implements data exchange with an external device through the communication section 510. For example, the communication section 108 is implemented by a wireless communication device, a modem, a terminal adaptor (TA), a jack for wired communication cable, a control circuit, or the like.

The terminal storage section 700 stores therein a system program for implementing various functions for causing the terminal processing section 600 to entirely control the user terminal 1500, a program and various types of data required for the gameplay, and the like. The terminal storage section 700 is also used as a work area for the terminal processing section 600, and temporarily stores results of calculations executed by the terminal processing section 600 in accordance with various programs, input data input from the operation input section 502, or the like. For example, the server storage section 700 is implemented by an IC memory such as a RAM or a ROM, a magnetic disc such as a hard disk, or an optical disc such as a CD-ROM or a DVD. In the present embodiment, the terminal storage section 700 stores a game client program 702.

The game client program 702 is application software that is read out and executed by the terminal processing section 600 to implement the function of the game control section 610. In the present embodiment, the game client program 702 is a copy of the distribution client program 304 (see FIG. 12) provided by the server system 1000. The game client program 702 may be an exclusive client program or include a web browser program and a plugin that implements interactive image display, depending on a technique and a method for implementing a game.

[Flow of Process]

Figure 16:
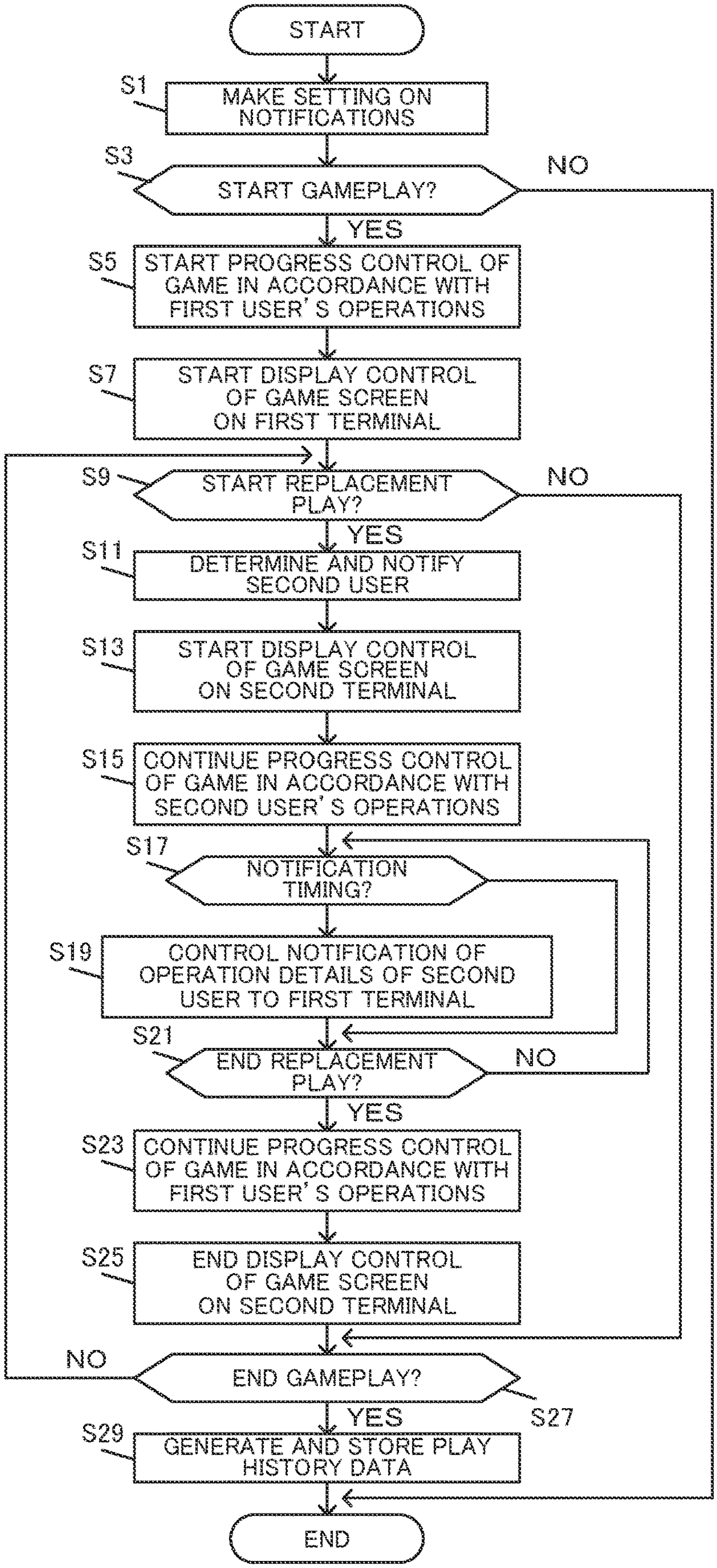
FIG. 16 is a flowchart of a game process.

FIG. 16 is a flowchart illustrating a flow of a game process performed by the server system 1000. This process is a process related to one gameplay by the first user and is performed in parallel for each of registered users as target first user.

First, the notification condition setting section 218 makes a setting on notifications of the details of operations performed by the second user during replacement play in accordance with the first user's operation (step S1). Then, if an instruction to start gameplay is issued by the first user (YES in step S3), the game management section 210 starts the progress control of the game in accordance with the first user's operations (step S5). The game management section 210 starts the display control of a game screen in accordance with the progress of the game on the first terminal of the first user (step S7).

If an instruction to start replacement play is issued by the first user (YES in step S9), the game management section 210 determines the second user from among the other users and notifies the determination to the first user and the second user (step S11). The game image display control section 212 starts the display control of the game screen in accordance with the progress of the game on the second terminal of the second user (step S13). That is, the game image display control section 212 performs display control of the game screen on the first terminal of the first user and the second terminal of the second user. The right to perform gameplay is transferred from the first user to the second user, and the progress control of the game is continued in accordance with the second user's operations (step S15). That is, the replacement play by the second user is started.

During the replacement play, the notification timing is determined in accordance with the first user's setting. That is, if the notification timing set by the first user is "always", it is determined that now is the notification timing. If the notification timing set by the first user is "when notification condition is satisfied", the determination section 216 determines whether the game situation during the replacement play satisfies the notification condition set by the first user. If determining that the notification condition is satisfied, it is determined that now is the notification timing. If the notification timing set by the first user is "when requested by the user", it is determined whether the acceptance section 220 has accepted a notification request from the first user's operation. If the acceptance section 220 has accepted, it is determined that now is the notification timing. If it is determined that now is the notification timing (YES in step S17), the notification control section 214 performs a control to provide a notification of the details of the operation performed by the second user on the first terminal of the first user (step S19).

Subsequently, it is determined whether an instruction to end the replacement play has been issued by the first user. If it is determined that no instruction has been issued (NO in step S21), the process returns to step S17. If it is determined that an instruction to end the replacement play has been issued (YES in step S21), the game management section 210 returns the right to perform gameplay from the second user to the first user, and continues the progress control of the game in accordance with the first user's operations (step S23), and terminates the display control of the game screen on the second terminal (step S25), thereby terminating the replacement play by the second user.

Subsequently, the game management section 210 determines whether the termination condition of the gameplay by the first user is satisfied. If the condition is not satisfied (NO in step S27), the process returns to step S9. If the termination condition of the gameplay is satisfied (YES in step S27), the game management section 210 ends the gameplay, and generates and stores the play history data 323 relating to the gameplay (step S29). Upon completion of the foregoing steps, the game process is terminated.

[Operation and Effects]

As described above, according to the present embodiment, in a game enabling replacement play in which the second user performs the first user's gameplay, the first user can easily grasp the details of the operation performed by the second user during the replacement play. That is, during the replacement play by the second user, in addition to display of the game image, the notification of the details of the operation input by the second user is provided on the first terminal of the first user. This allows the first user to grasp the details of the operation performed by the second user from the notification while watching the game image.

[Modification]

Applicable embodiments of the present disclosure are not limited to the above-described embodiment. The above-described embodiment can be changed as appropriate without deviating from the gist of the present disclosure.

(A) Notification Timing

In the above-described embodiment, the first user sets the timing for providing a notification of the details of an operation performed by the second user on the first terminal during the replacement play. Alternatively, the second user may set the notification timing.

(B) Target Game

In the above-described embodiment, a fighting match game is taken as an example. However, the type of applicable game is not limited to this. For example, the present disclosure can be applied to any type of game such as role-playing game, action game, rhythm game, or shooting game. In addition, a single play online game is taken as an example, but a multiplay online game may be implemented instead.

(C) Other Configuration Examples of Game System

Figure 17:
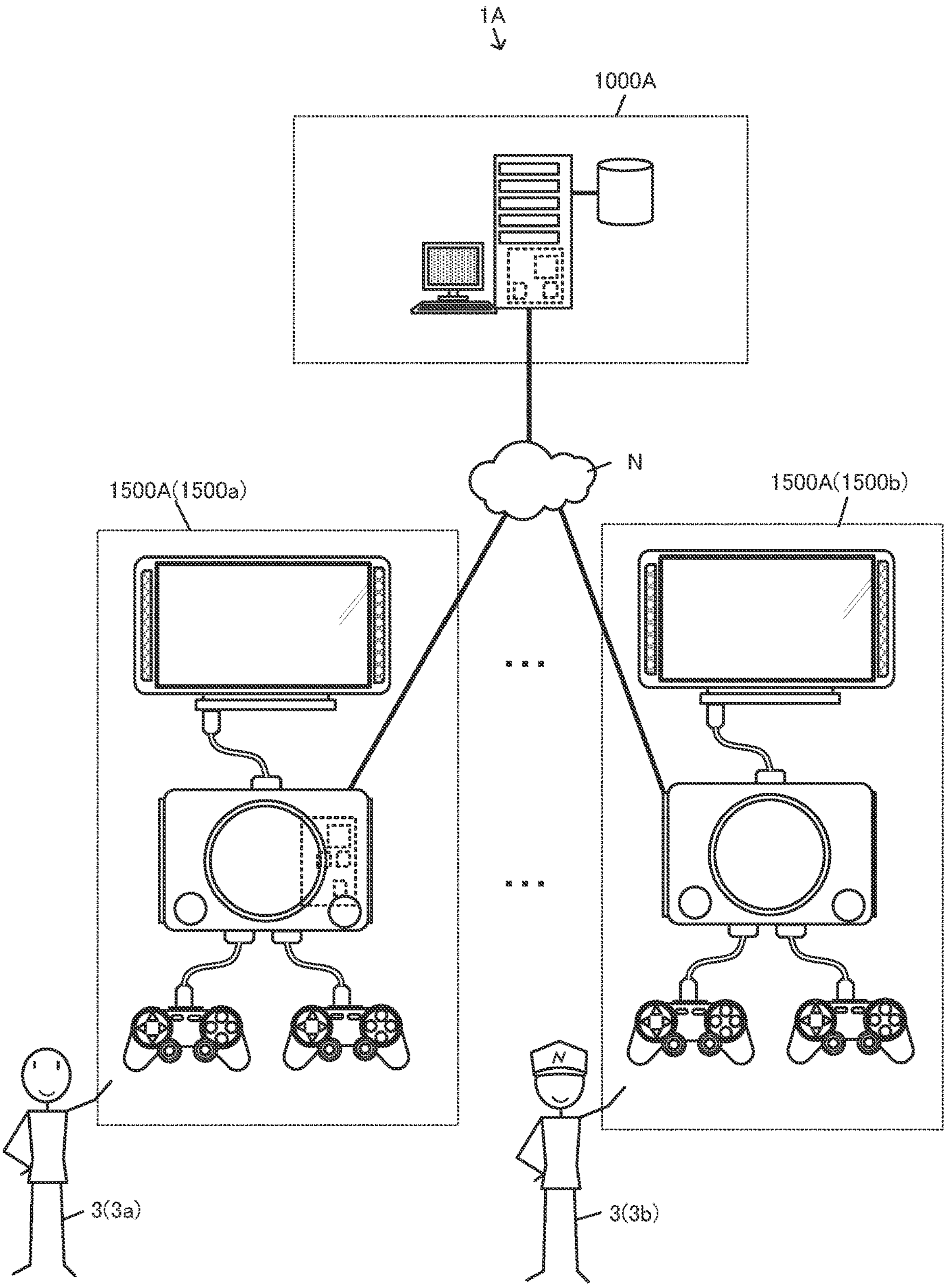
FIG. 17 is a diagram illustrating another example of a configuration of a game system.

In the above-described embodiment, the user terminal 1500 is a smartphone. Alternatively, the user terminal 1500 may be another electronic apparatus (electronic device). For example, as in an example illustrated in FIG. 17, a stationary consumer game apparatus may be used as a user terminal 1500A. In this case, the consumer game apparatus that is the first terminal may also have the function of the game management section 210 of the server system 1000 to perform the control relating to replacement play.

Figure 18:
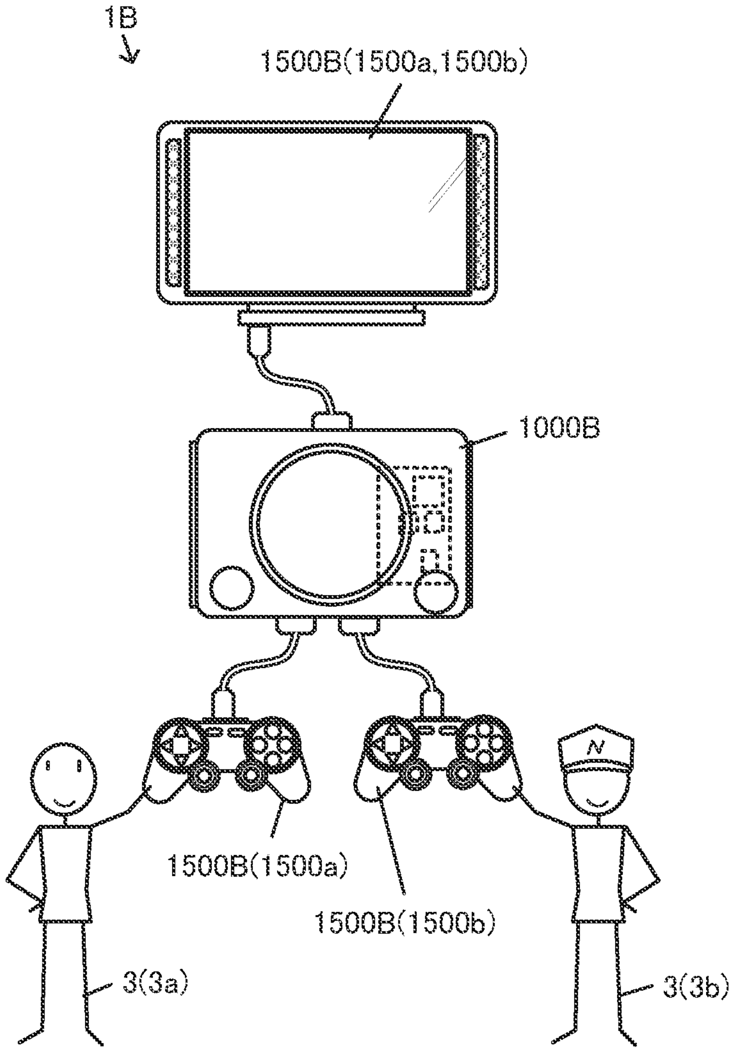
FIG. 18 is a diagram illustrating another example of a configuration of a game system.

Further, as in an example illustrated in FIG. 18, a game system 1B may be formed by one stationary consumer game apparatus formed by wired or wireless communication connection of a plurality of game controllers to a main body device. In this case, the main body device of the consumer game apparatus functions as a server system 1000A. A first terminal 1500*a* that is a first-user interface used by a user 3*a* that is the first user constitutes the game controller and display on one side, and a second terminal 1500*b* that is a second-user interface used by a user 3*b* that is the second user constitutes the game controller and display on the other side. For example, the game controller has the functions of the operation input section 502 and the vibration section 508, and the display has the functions of the image display section 504 displaying the display screen and the sound output section 506. That is, the first terminal and the second terminal have a common display screen.

(D) Timing of Replacement Play

In the above-described embodiment, the second user performs replacement play in real time during the gameplay of the first user. Alternatively, the second user may perform replacement play with a delay after the end of gameplay by the first user.

Figure 19:
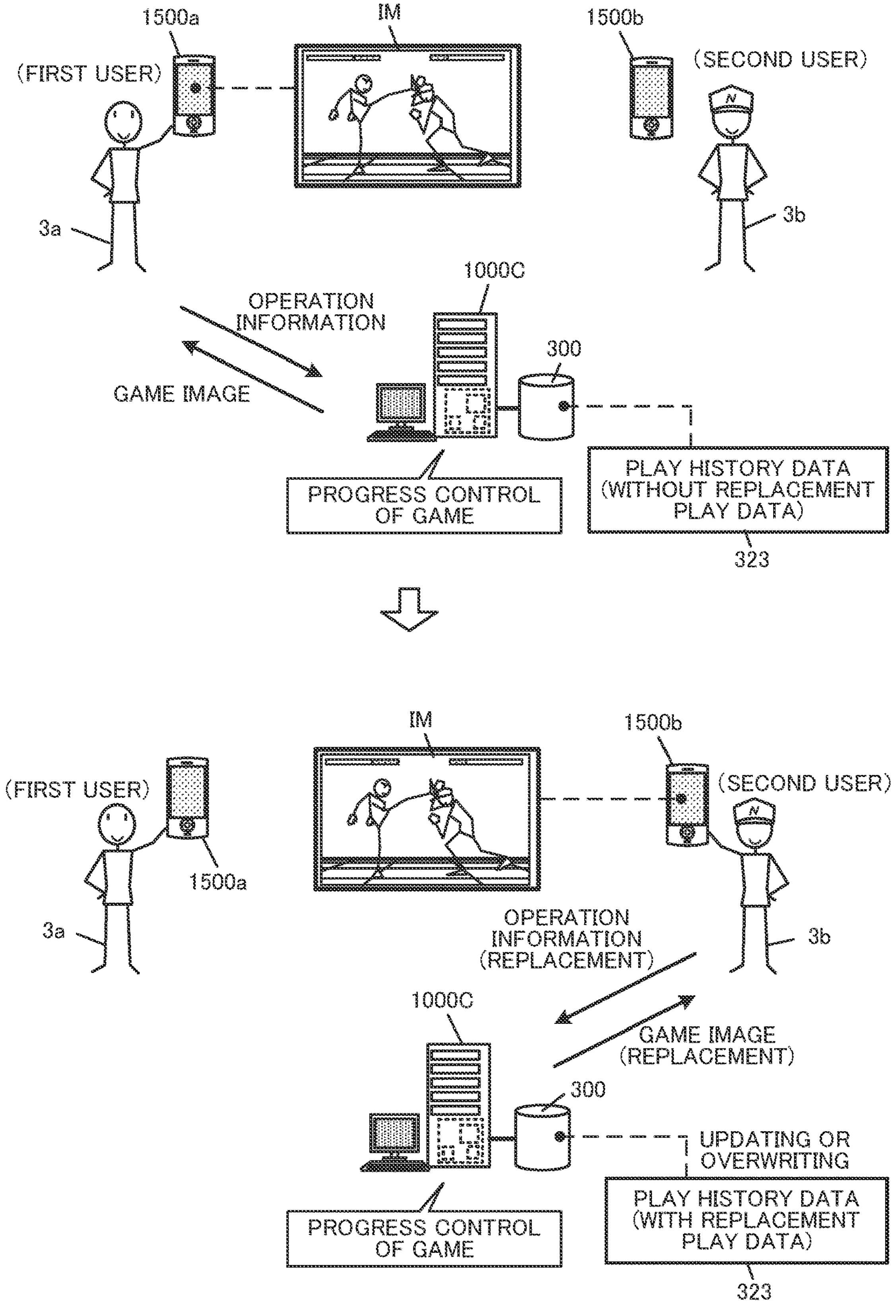
FIG. 19 is a diagram illustrating another example of replacement play.

Specifically, as illustrated in FIG. 19, first, the first user performs gameplay using the first terminal. At this time, the second user does not perform replacement play. The data relating to the gameplay by the first user is stored as play history data 323 in a server storage section 300 of a server system 1000C. Since no replacement play is performed, the play history data 323 does not contain replacement play data 336.

After that, the second user performs replacement play for the gameplay of the first user. That is, the server system 1000C reconstructs a game space using operation history data 334, character control history data 335, and the like contained in the play history data 323 to reproduce the gameplay of the first user, and displays the reproduced game image on the second terminal of the second user. Then, for a period preset by the first user during which replacement play is possible in the reproduced gameplay, the server system 1000C performs the progress control of the game based on the operation information of the second user acquired from the second terminal instead of the operation information of the first user, and displays the game image on the second terminal. The data on the gameplay in which reproduced and replacement plays were performed is additionally stored as new play history data 323 in the server storage section 300 of the server system 1000C. The play history data 323 contains the replacement play data 336. The first user may limit the number of times of replacement play to be performed, the number of times of new play history data 323 to be additionally stored, the user(s) allowed to perform replacement play, and the like.

Figure 20:
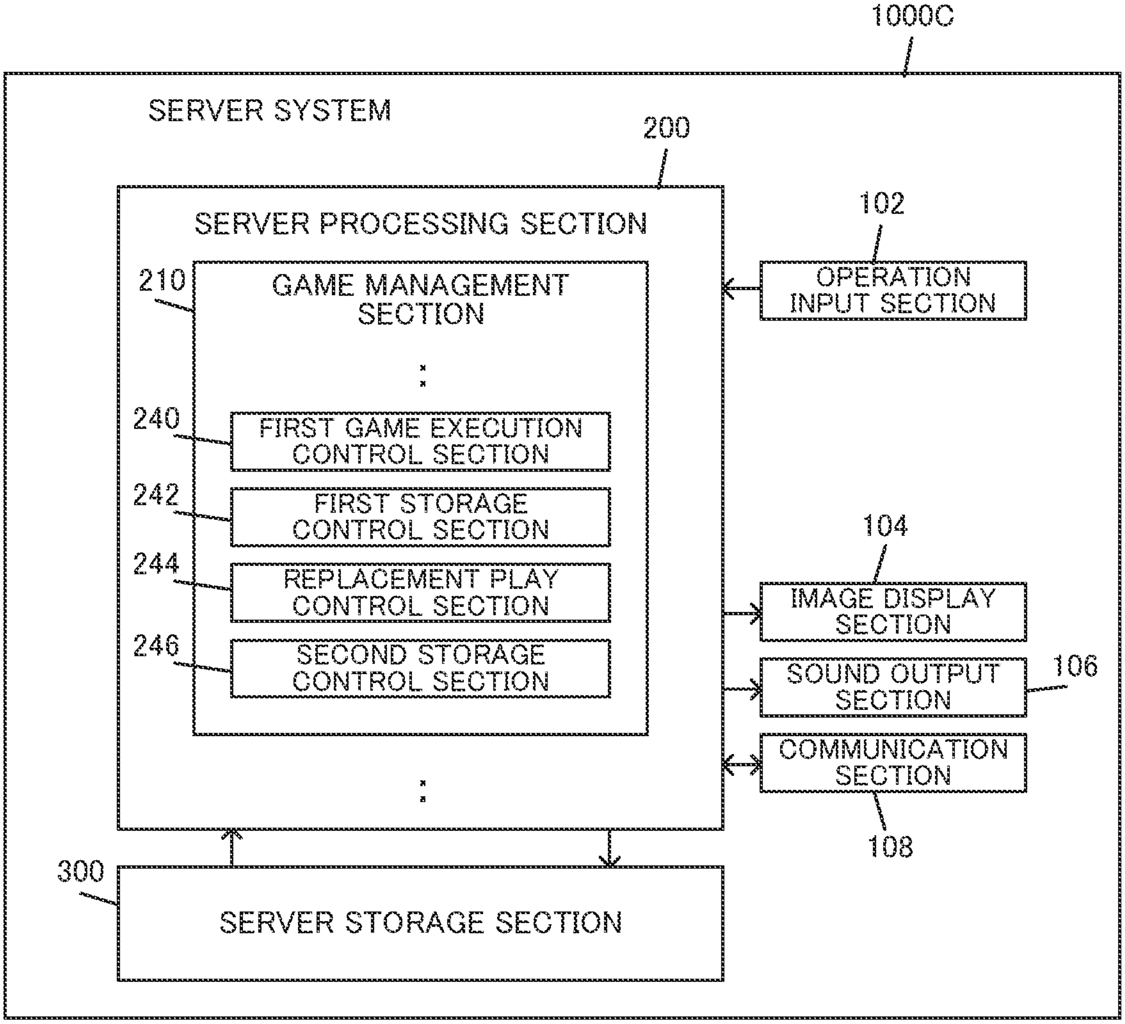
FIG. 20 is a diagram illustrating another example of a configuration of a server system.

FIG. 20 illustrates an example of a functional configuration of the server system 1000C in this case. The game management section 210 of the server system 1000C further has a first game execution control section 240, a first storage control section 242, a replacement play control section 244, and a second storage control section 246.

The first game execution control section 240 controls execution of gameplay by the first user using the first terminal that is the first-user interface. No replacement play is performed in this gameplay.

The first storage control section 242 stores the data of the gameplay performed by the first user using the first terminal that is the first-user interface (the play history data 323) in a predetermined storage section. The predetermined storage section may be, for example, the server storage section 300 or a storage device separate from the server system 1000C accessible by the user terminal 1500.

The replacement play control section 244 reproduces the gameplay of the first user based on the data (the play history data 323) stored in the first storage control section 242, and controls the execution of the replacement play by the second user to the reproduced gameplay using the second terminal that is the second-user interface. The notification control section 214 generates the data indicating the operation details based on the operation input by the second user, for the replacement play of which execution is controlled by the replacement play control section 244.

Based on the data stored in the predetermined storage section, the second storage control section 246 stores in a predetermined storage section new play history data 323 containing the data of the replacement play performed by the second user using the second-user interface and the data indicating the operation details based on the operations input by the second user using the second-user interface during the replacement play, which is generated by the notification control section 214. Based on the play history data 323 stored in the predetermined storage section, the replay video display control section 222 controls the display of the replay video of the replacement play on arbitrary user terminals 1500 including the first terminal and the second terminal, and provides a notification of the operation details based on the operation input by the second user during the replacement play.

Although only some embodiments of the present disclosure have been described in detail above, those skilled in the art will readily appreciate that many modifications are possible in the embodiments without materially departing from the novel teachings and advantages of this disclosure. Accordingly, all such modifications are intended to be included within scope of this disclosure.

What is claimed is:

1. A computer system comprising at least one processor or circuit programmed to execute:

a game management of managing execution of an electronic video game in which a second user can perform replacement play in the electronic video game using a controller of a second electronic device in place of gameplay performed by a first user using a controller of first electronic device;

a game image display control of displaying a game image of the electronic video game during the replacement play on display screens of the first electronic device and the second electronic device; and a notification control of automatically causing the first electronic device to provide a computer-generated notification of operation details executed in the electronic video game in real-time, based on the operation input via the controller of the second electronic device by the second user during the replacement play, wherein the notification control includes displaying the notification of the operation details on the display screen of the first electronic device on which the game image is displayed during the replacement play, the notification of the operational details being a series of icons corresponding to a sequence of commands input on the controller of the second electronic device of the second user or a name of an action performed in the electronic video game by the second user, and wherein the notification control includes automatically providing the series of icons or the name of the action at a timing when the second user input the operation in real time.

2. The computer system as defined in claim 1, wherein the notification control includes automatically providing the notification of a command input by the second user or an action based on the command.

3. The computer system as defined in claim 1, wherein the notification control includes superimposing the notification on the game image.

4. The computer system as defined in claim 1, wherein the notification control includes displaying the notification outside the game image.

5. The computer system as defined in claim 1, wherein the notification control includes vibrating a vibrator provided in the first electronic device or controlling output of a sound.

6. The computer system as defined in claim 1, wherein the at least one processor or circuit is further programmed to determine whether a game situation during the replacement play satisfies a given notification condition, and the notification control includes causing the first electronic device to provide the notification if it is determined that the notification condition is satisfied.

7. The computer system as defined in claim 6, wherein the at least one processor or circuit is further programmed to set the notification condition based on the first user's setting operation.

8. The computer system as defined in claim 1, wherein the at least one processor or circuit is further programmed to accept a notification request based on the first user's operation input during the replacement play, and the notification control includes causing the first electronic device to provide the notification if the notification request is accepted.

9. The computer system as defined in claim 1, wherein the at least one processor or circuit is further programmed to perform a control to display a replay video of the replacement play on the display screen of the first electronic device, and the notification control includes causing the first electronic device to provide the notification during the display control of the replay video.

10. The computer system as defined in claim 1, wherein the at least one processor or circuit is further programmed to:

store data of the gameplay performed by the first user using the first electronic device in a predetermined storage section; and based on the data stored in the storage section, store data of the replacement play performed by the second user using the second electronic device and data indicating the operation details based on the operation input by the second user during the replacement play in the storage section.

11. A game system comprising:

a server system that is the computer system as defined in claim 1;

the first electronic device; and the second electronic device.

12. The computer system as defined in claim 1, wherein the controller is a touchscreen.

13. The computer system as defined in claim 1, wherein the controller is a push switch, a joystick, or a track ball.

14. The computer system as defined in claim 1, wherein the sequence of commands is displayed as a predetermined number of latest commands in time series.

15. The computer system as defined in claim 1, wherein the sequence of commands that are displayed are commands input on the controller of the second electronic device of the second user within a predetermined number of past seconds.

16. A replacement play execution control method executed by a computer system connected to communicate with a first-user interface and a second-user interface, the method comprising:

managing execution of electronic video game in which a second user can perform replacement play in the electronic video game using the a controller of a second electronic device in place of gameplay performed by a first user using a controller of first electronic device;

performing a control to display a game image of the electronic video game during the replacement play on display screens of the first electronic device and the second electronic device;

causing the first electronic device to automatically provide a computer-generated notification of operation details executed in the electronic video game in real-time, based on the operation input via the controller of the second electronic device by the second user during the replacement play; and displaying the notification of the operation details on the display screen of the first electronic device on which the game image is displayed during the replacement play, the notification of the operational details being a series of icons corresponding to a sequence of commands input on the controller of the second electronic device of the second user or a name of an action performed in the electronic video game by the second user, wherein the notification control includes automatically providing the series of icons or the name of the action at a timing when the second user input the operation in real time.

* * * * *